United States Patent
Kitamura

(10) Patent No.: US 7,386,758 B2
(45) Date of Patent: Jun. 10, 2008

(54) METHOD AND APPARATUS FOR RECONSTRUCTING DATA IN OBJECT-BASED STORAGE ARRAYS

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 547 days.

(21) Appl. No.: 11/033,897

(22) Filed: Jan. 13, 2005

(65) Prior Publication Data

US 2006/0156059 A1    Jul. 13, 2006

(51) Int. Cl.
*G06F 11/00*    (2006.01)
(52) U.S. Cl. .................... 714/6; 711/114; 707/103 R
(58) Field of Classification Search .............. None
See application file for complete search history.

(56) References Cited

U.S. PATENT DOCUMENTS

| | | | |
|---|---|---|---|
| 5,208,813 | A | 5/1993 | Stallmo |
| 6,449,730 | B2 * | 9/2002 | Mann et al. .................. 714/6 |
| 6,530,036 | B1 * | 3/2003 | Frey, Jr. ........................ 714/6 |
| 2002/0059539 | A1 * | 5/2002 | Anderson ........................ 714/6 |
| 2002/0169995 | A1 * | 11/2002 | Archibald et al. .............. 714/6 |
| 2003/0120863 | A1 * | 6/2003 | Lee et al. ...................... 711/114 |
| 2005/0257083 | A1 * | 11/2005 | Cousins ......................... 714/6 |

OTHER PUBLICATIONS

Menon, Jai, "A Performance Comparison of RAID-5 and Log-Structured Arrays", 1995, IEEE.*
R. O. Weber, Working Draft, Project T10/1355-D, Information Technology—SCSI Object-Based Storage Device Commands (OSD), Feb. 19, 2004, pp. 1-155.

* cited by examiner

*Primary Examiner*—Gabriel Chu
(74) *Attorney, Agent, or Firm*—Mattingly, Stanger, Malur & Brundidge, PC

(57) ABSTRACT

A method and apparatus for placing objects on a storage device of a storage system and reconstructing data of objects in the storage device. The storage system stores data as objects and implements a RAID architecture including a plurality of the storage devices, and a disk controller for processing Object-based Storage Device (OSD) commands. Each object includes data and attribute. Parity data is calculated for reconstructing an object upon occurrence of a storage device failure. Each storage device includes plural stripes each having a predetermined length. Each object is stored in a stripe wherein an attribute is stored in the head of the stripe and data is stored after the attribute. When the object size exceeds the stripe length, the remainder of the object is stored in the next stripe, and when another object is to be stored, an attribute is stored at a head of a further next stripe and data is stored just after the attribute.

14 Claims, 18 Drawing Sheets

| PORT | LUN | Disk | RAID level | Stripe size |
|---|---|---|---|---|
| 0 | 0 | 1, 2, 3, 4 | 5 | 32KB |
|  | 1 | 5, 6, 7, 8 | 5 | 64KB |
|  | ⋮ | ⋮ | ⋮ | ⋮ |
|  | k | m, m+1 | 1 | - |
| 1 | 0 | 102,103,104,105 |  |  |
|  | 1 |  |  |  |
|  | ⋮ | ⋮ | ⋮ | ⋮ |

| PORT | LUN | Partition ID | Object ID | Disk Location |
|---|---|---|---|---|
| 0 | 0 | 10000 | 10000 | 1-1, 2-1 |
| | | | 10001 | 1-2 |
| | | | 10002 | 2-2, 4-2, 1-3, 3-3 |
| | | | ⋮ | |
| | | 10001 | 10000 | 3-1, 4-3 |
| | | | 10001 | 1-5, 2-5, 3-5 |
| | | | 10002 | |
| | | | ⋮ | ⋮ |
| | | ⋮ | ⋮ | ⋮ |
| | 1 | 10000 | 10000 | 1-7 |
| | | | ⋮ | ⋮ |

200

| Stripe (251) | PORT (252) | LUN (253) | Partition ID (254) | Object ID (255) |
|---|---|---|---|---|
| 1-1 | 0 | 0 | 10000 | 10000 |
| 1-2 | 0 | 0 | 10000 | 10000 |
| 1-3 | 0 | 0 | 10001 | 10000 |
| 1-5 | 0 | 0 | | |
| ⋮ | ⋮ | ⋮ | ⋮ | ⋮ |
| 2-1 | 0 | 0 | 10000 | 10000 |
| 2-2 | 0 | 0 | 10002 | 10000 |
| 2-4 | 0 | 0 | 0xFFFFFFFF | 0xFFFFFFFF |
| ⋮ | ⋮ | ⋮ | ⋮ | ⋮ |

| Stripe | Recovery | Done |
|--------|----------|------|
| 3-1 | 1 | 1 |
| P2 | 1 | 0 |
| 3-3 | 1 | 0 |
| 3-4 | 0 | 0 |
| 3-5 | 1 | 0 |
| P6 | 1 | 0 |
| ⋮ | | ⋮ |

| PORT | LUN | Partition ID | Object ID | Disk Location |
|---|---|---|---|---|
| 0 | 0 | 10000 | 10000 | 1-1, 2-1 |
| | | | 10001 | 1-2 |
| | | | 10002 | 2-2, 2-3, 1-3, 3-3 |
| | | | ⋮ | |
| | | 10001 | 10000 | 3-1, 3-4 |
| | | | 10001 | 1-5, 2-5, 3-5 |
| | | | 10002 | |
| | | | ⋮ | ⋮ |
| | | ⋮ | ⋮ | ⋮ |
| | 1 | 10000 | 10000 | 1-7 |
| | | | ⋮ | ⋮ |

200'

| Stripe | PORT | LUN | Partition ID | Object ID |
|---|---|---|---|---|
| 1-1 | 0 | 0 | 10000 | 10000 |
| 1-2 | 0 | 0 | 10000 | 10001 |
| 1-3 | 0 | 0 | 10002 | 10000 |
| 1-4 | 0 | 0 | | |
| ⋮ | ⋮ | ⋮ | ⋮ | ⋮ |
| 2-1 | 0 | 0 | 10000 | 10000 |
| 2-2 | 0 | 0 | 10002 | 10000 |
| 2-3 | 0 | 0 | 10002 | 10000 |
| ⋮ | ⋮ | ⋮ | ⋮ | ⋮ |

FIG. 20

| Stripe | New Location | Done | Parity |
|---|---|---|---|
| 3-1 | K-1 | 1 | 0 |
| 3-4 | K-2 | 0 | 1 |
| 3-3 | K-3 | 0 | 0 |
| 3-5 | K-5 | 0 | 0 |
| ⋮ | ⋮ | ⋮ | |

FIG. 21

METHOD AND APPARATUS FOR RECONSTRUCTING DATA IN OBJECT-BASED STORAGE ARRAYS

BACKGROUND OF THE INVENTION

The present invention relates generally to placing and reconstructing data in a storage system. More particularly the present invention relates to a method, apparatus and computer program for placing and reconstructing data in an object-based storage system.

Recent storage systems that are used in the high-end or mid-range computer systems usually adopt the Redundant Array of Inexpensive Disks (RAID) architecture. The RAID architecture provides various levels including, for example, RAID levels 1-5 defined as follows:

RAID 1: uses "mirroring" techniques.

RAID 2: stores each bit of each word of data, plus Error Detection and Correction (EDC) bits for each word, such as a Hamming Code, on separate disk drives. This is also known as "bit striping".

RAID 3: is based on the concept that each disk drive storage unit has internal means for detecting a fault or data error. Therefore, it is not necessary to store extra information to detect the location of an error. Thus, a simpler form of parity-based error correction can be used. In this approach, the contents of all storage units subject to failure are "Exclusively OR-ed" (XOR) to generate parity information. The resulting parity information is stored in a single redundant storage unit. If a storage unit fails, the data on the redundant storage unit can be reconstructed onto a replacement storage unit by XOR-ing the data from the remaining storage units with the parity information.

RAID 4: uses the same parity error correction concept of the RAID 3 architecture, but improves on the performance of the RAID 3 architecture with respect to random reading of small files by using block-level interleaving. The RAID 4 architecture reads and writes a larger minimum amount of data, typically a disk sector, to each disk. This is also known as block striping. A further aspect of the RAID 4 architecture is that a single storage unit is designated as the parity unit.

RAID 5: uses the same parity error correction concept of the RAID 4 architecture and independent actuators, but improves on the writing performance of the RAID 4 architecture by distributing the data and parity information across all of the available disk drives. Typically, "N+1" storage units in a set, also known as a "redundancy group," are divided into a plurality of equally sized address areas referred to as blocks. Each storage unit generally contains the same number of blocks. Blocks from each storage unit in a redundancy group having the same unit address ranges are referred to as "stripe group". Each stripe group has N blocks of data, plus one parity block on one storage unit containing parity for the remainder of the blocks. Further, each stripe group has a parity block, wherein the parity blocks are distributed on different storage units. Parity updating activity associated with every modification of data in a redundancy group is therefore distributed over the different storage units. No single storage unit is burdened with all of the parity update activity.

As described above, the current RAID techniques generate redundant information on either one of a bit, byte, or block basis.

Recently another technological trend has begun, where data is stored into the storage devices such as magnetic disks on an object basis, not a block basis. Such a storage device or system which stores data as an object is called an Object-Based Storage Device (OSD).

Each object as defined includes data and an attribute. The Attribute includes information such as the size of the data, user identification (ID) information, etc. Since the attribute maintains the size of the data in the object, the object size is variable, different from current storage devices such as Hard Disk Drives (HDDs) which use fixed-length blocks. These objects can be used to store a variety of data, including files, database records and e-mail. The combination of data and attribute allows an OSD to make decisions on data layout or quality of service on a per-object basis, thereby improving performance, flexibility and manageability.

The disadvantage of RAID architectures is that they take a large amount of time to reconstruct data of a failed disk drive, because the storage system adopting the RAID architecture reads all data blocks in the disk drives that are associated with the failed disk drive. The data reconstruction process of the RAID architecture has to be performed on all data blocks of the disk drives even if only a small amount of data stored in the disk drives require reconstruction. Such is partly due to traditional RAID systems not maintaining information regarding the location of data or files in the disk drives.

OSD maintains information indicating where each object is stored in the OSD. However, current OSD standards do not take into consideration the functionalities necessary to implement a RAID architecture in an OSD. Particularly, the current OSD standards do not provide a method for the placement and reconstruction of data in an OSD which implements a RAID architecture.

U.S. Pat. No. 5,208,813 discloses a method for reconstructing data of failed storage devices in redundant arrays. However, the method disclosed in U.S. Pat. No. 5,208,813 is only applied to data reconstruction of all data blocks in the failed storage devices implementing a RAID architecture.

ANSI T-10 Working Draft discloses the concept of OSD (ANSI T-10 Working Draft). However, this draft does not consider the functionalities or features necessary to apply OSD technology to RAID storage systems.

Therefore, a need exists for a method and apparatus for placing objects on an RAID storage system and reconstructing data in the RAID storage system.

SUMMARY OF THE INVENTION

The present invention provides a method and apparatus for placing objects on a RAID storage system and reconstructing data of objects in an RAID storage system.

The present invention provides a storage system for storing data as objects which includes a plurality of storage devices and a disk controller for controlling the storage devices. Each of the objects includes data and attributes of the data. Corresponding to each object redundant data (e.g. parity data) is calculated for use in reconstructing the object if the storage device upon which the object is stored fails.

According to the present invention, the storage devices are configured to implement a RAID architecture, wherein each of the storage devices is formatted to include a plurality of stripes each having a fixed predetermined length, and at least one logical unit (LU) is formed by all or a portion of one or a plurality of storage devices. Each object is stored on a LU such that an attribute of the object is stored in the head of a stripe and data of the object is stored just after the attribute. When another object is to be stored, an attribute of the other object is stored at a head of the next stripe and data of the other object is stored just after the attribute in the next stripe. A stripe which includes attribute and data or simply data is referred to as a data stripe. Depending upon the RAID architecture being implemented, parity data is calculated based on certain ones of the data stripes. The parity data is stored in a stripe of a storage device and such stripe is referred as a parity stripe.

Further according to the present invention, when the size of the object, including the attribute and the data, exceeds the predetermined length of the stripe, the remainder of the object is stored in the next stripe, and when another object is to be stored, an attribute of the other object is stored at a head of a stripe other than the stripe and the next stripe and data of the other object is stored just after the attribute.

The disk controller processes input/output (I/O) requests and other requests for processing objects stored on or to be stored on LUs in accordance with OSD commands. These commands include, for example, READ command, GET ATTRIBUTE command, a CREATE command, CREATE AND WRITE command, WRITE command, APPEND command, and a REMOVE command. During such processing the disk controller, in response to the write request, divides the data into a plurality of objects and writes each object in one of the storage devices.

Still further according to the present invention provides a storage system for storing data as objects which includes a plurality of storage devices and a disk controller for controlling the storage devices. At least one of the storage devices stores parity data which is used to reconstruct objects stored on the other storage devices. The data reconstruction process according to the present invention starts when a storage device fails. The disk recovery process includes assigning the replacement disk to replace the failed storage device as indicated by a disk status table, creating a disk reconstruction bitmap, and reconstructing data stripes using parity stripes according to a RAID technique in a manner such that data reconstruction need only occur with respect to the objects of the failed storage device.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 8 is a diagram for explaining a physical-logical mapping table 250 according to an embodiment of the present invention;

FIG. 13 is a diagram for explaining a disk reconstruction bitmap 400 according to an embodiment of the present invention;

FIG. 20 is a diagram for explaining a physical-logical mapping table 250' according to another embodiment of the present invention;

FIG. 21 is a diagram for explaining a disk reconstruction bitmap 400' according to another embodiment of the present invention.

DETAILED DESCRIPTION OF THE INVENTION

The present invention as will be described in greater detail below provides an apparatus, method and computer program, particularly, for example, a method and apparatus for placing objects on a storage device of a storage system processing OSD commands and reconstructing data of objects in a storage device of a storage system. The present invention provides various embodiments including the $1^{st}$ and $2^{nd}$ embodiments as described below. However it should be noted that the present invention is not limited to the embodiments described herein, but could extend to other embodiments as would be known or as would become known to those skilled in the art.

I. 1st Embodiment

Figure 1:
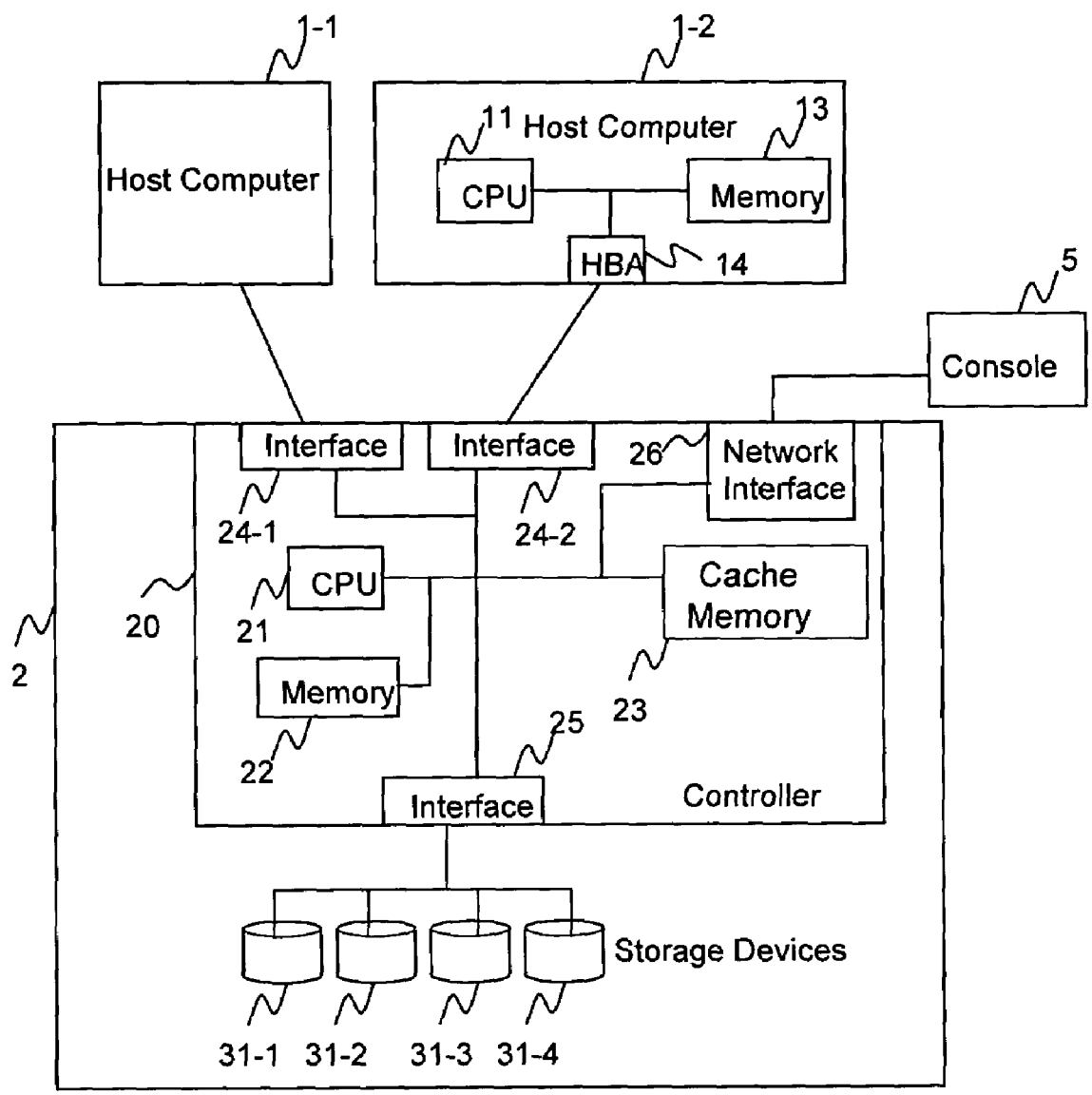
FIG. 1 is a diagram for explaining an example storage system in which the method, apparatus and computer program for placing and reconstructing data in a RAID storage system according to the present invention are applied.

A. System Configuration:

FIG. 1 illustrates an example of a storage system 2 in which the method and apparatus of the present invention is applied. The storage system 2 includes a disk controller 20 and a plurality of storage devices 31-1 through 31-4 which are controlled by the disk controller 20.

The disk controller 20 includes a central processing unit (CPU) 21, memory 22, cache memory 23, at least one host interface 24-1 and 24-2, at least one disk interface 25, and a network interface 26. Each host interface 24-1, 24-2 is connected to a corresponding host computer 1-1, 1-2 (called generally, host computer 1). The disk controller 20 processes I/O requests from a host computer 1-1, 1-2. An I/O request from the host computer 1-1, 1-2 is based on Object-Based Storage Device Commands (OSD Commands).

A program to process I/O requests or other operations is stored in the memory 22, and the CPU 21 executes the program. The cache memory 23, which could for example be non-volatile memory, temporarily stores data which forms part of a write request from the host computer 1 before the data is stored into the storage devices 31-1 through 31-4, or temporarily stores read data that has been read from the storage devices 31-1 through 31-4 in response to a read request from the host computer 1. The cache memory 23 could, for example, be implemented by a semiconductor memory with battery backed-up, or flash memory. In another implementation, the memory 22 and cache memory 23 could, for example, be combined to be part of a same common memory component.

Each host interface 24-1, 24-2 connects the storage system 2 to a corresponding host computer 1-1, 1-2. The host interface 24-1, 24-2 is also known as a port. The host interface 24-1, 24-2 could, for example, be a traditional storage interface such as Small Computer Serial Interface (SCSI), Fibre Channel interface, etc. Or in another embodiment, the host interface 24-1, 24-2 could, for example, be a network interface such as an Ethernet interface. The disk interface 25 is used to connect the storage devices 31-1 through 31-4 to the disk controller 20. The disk interface 25 could, for example, be a traditional interface such as SCSI, Fibre Channel interface, etc. Or in another embodiment, the disk interface 25 could, for example, be a network interface such as Ethernet interface.

The network interface 26 could, for example, connect the storage system 2 to a console 5 which is used to set and/or change configuration of the storage system 2. Each storage device 31-1 through 31-4 is a device formatted in accordance with the fixed-length block architecture (FBA) format, and processes commands for the FBA format, for example, Fibre Channel Protocol-Small Computer System Interface (FCP-SCSI) commands or Internet SCSI (iSCSI) commands.

Figures 2, 3:
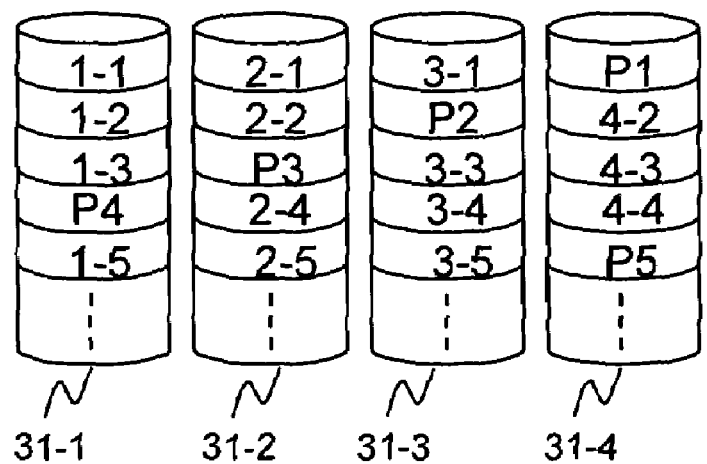
FIG. 2 is a diagram illustrating the layout of storage devices implementing a RAID configuration according to an embodiment of the present invention.
FIG. 3 is a diagram for explaining a RAID configuration table 300 according to an embodiment of the present invention.

B. Redundant Arrays:

In the present embodiment, the storage system 2 can, for example, construct one or more logical storage devices, and the host computer 1-1, 1-2 issues I/O requests in accordance with OSD commands towards the logical storage devices. Each logical storage device can, for example, be formed by portions or all of one or a plurality of storage devices 31-1 through 31-4. Each storage device 31-1 through 31-4 as illustrated in FIG. 2 includes a layout implementing a RAID configuration. In the present embodiment, a logical storage device may be called a logical unit (LU). To distinguish multiple LUs, wherein each LU has its own unique number starting from 0. The unique number is called a logical unit number (LUN).

FIG. 2 illustrates an example of a redundant array of logical storage devices, and FIG. 3 illustrates a RAID configuration table 300 which defines the RAID architectures being implemented in the storage devices 31-1 through 31-4 according to the present invention.

Each entry of the RAID configuration table 300 defines for each port (Port 301) and logical storage device (LUN 302), the storage devices which form the logical storage device (Disk 303), the RAID architecture implemented on the logical storage device (RAID level 304), and the size of the stripes of on each storage device forming a part of the logical storage device (Stripe size 305). Thus, for example, as per FIG. 3 for port 0 and logical storage device identified as LUN 0, the logical storage device is composed of four storage devices 31-1, 31-2, 31-3, 31-4, the storage devices 31-1, 31-2, 31-3, 31-4 implement a RAID 5 architecture (distributed parity), and the size of each stripe on each storage device 31-1, 31-2, 31-3, 31-4 is 32 Kilo-Bytes (KB).

According to the present invention each storage device 31-1, 31-2, 31-3, 31-4 has a plurality of fixed-length regions where data is stored. In the present embodiment, each fixed-length region is called a stripe. The length of each stripe is defined in the RAID configuration table 300. The length of each stripe can, for example, be multiples of a block. Usually the size of a block is 512 bytes. Further, in the present embodiment, each stripe has its own unique identifier. For example, as illustrated in FIG. 2 storage device 31-1 has stripes 1-1, 1-2, 1-3, P4, 1-5, etc, whereas storage device 31-2 has stripes 2-1, 2-2, P3, 2-4, 2-5, etc.

In the stripes identified as 1-1, 2-1 etc., data written from the host computer 1-1, 1-2 is stored. These stripes are thus called data stripes. In case of a data stripe, the number 'x' in the stripe (1-x) is called a stripe number. In the stripes identified as P1, P2, etc., parity data is stored. These stripes are thus called parity stripes. In case of a parity stripe, the number 'y' in the stripe Py is called a parity stripe number. When the RAID 5 architecture is implemented, a parity stripe Px (x=1, 2, 3 . . . ) is calculated from all data stripes that are in the same row by the following formulas:

$Px=(1-x)XOR(2-x)XOR(3-x)$ (when $x=1, 5, 9, \ldots$)

$Px=(1-x)XOR(2-x)XOR(4-x)$ (when $x=2, 6, 10, \ldots$)

$Px=(1-x)XOR(3-x)XOR(4-x)$ (when $x=3, 7, 11, \ldots$)

$Px=(2-x)XOR(3-x)XOR(4-x)$ (when $x=4, 8, 12, \ldots$)

When the host computer 1-1, 1-2 writes data, namely an object, to a logical storage device, the host computer 1-1, 1-2 specifies one of the logical storage devices by specifying a LUN. The storage system 2 has two kinds of identification numbers to which it responds, namely the Port (number) and the LUN. By specifying these two identification numbers, one logical storage device is determined. Thus, for example, when host computer 1-1, 1-2 issues an I/O command to the storage system 2, it designates Port and LUN. In the present embodiment, two port numbers are defined. Port 0 corresponds to the interface 24-1, and Port 1 corresponds to the interface 24-2. Each LU is attached to either the host interface 24-1 or the host interface 24-2. In another embodiment, some of the LUs may be attached to both of the host interfaces 24-1 and 24-2.

The storage system 2 manages each storage device 31-1, 31-2, 31-3, 31-4 by assigning a unique number. These unique numbers are called disk numbers. In FIG. 3, for example, the LU whose port number is 0 and LUN is 0 comprises disk numbers 1, 2, 3 and 4 as per the first row.

In the RAID architecture, even if one of the storage devices 31-1, 31-2, 31-3, 31-4 that construct a logical storage device fails, the data in the failed storage device is recovered by using parity. Thereafter, the failed storage device is replaced with one of the hot-standby storage devices included in the storage system 2.

Figures 4, 5:
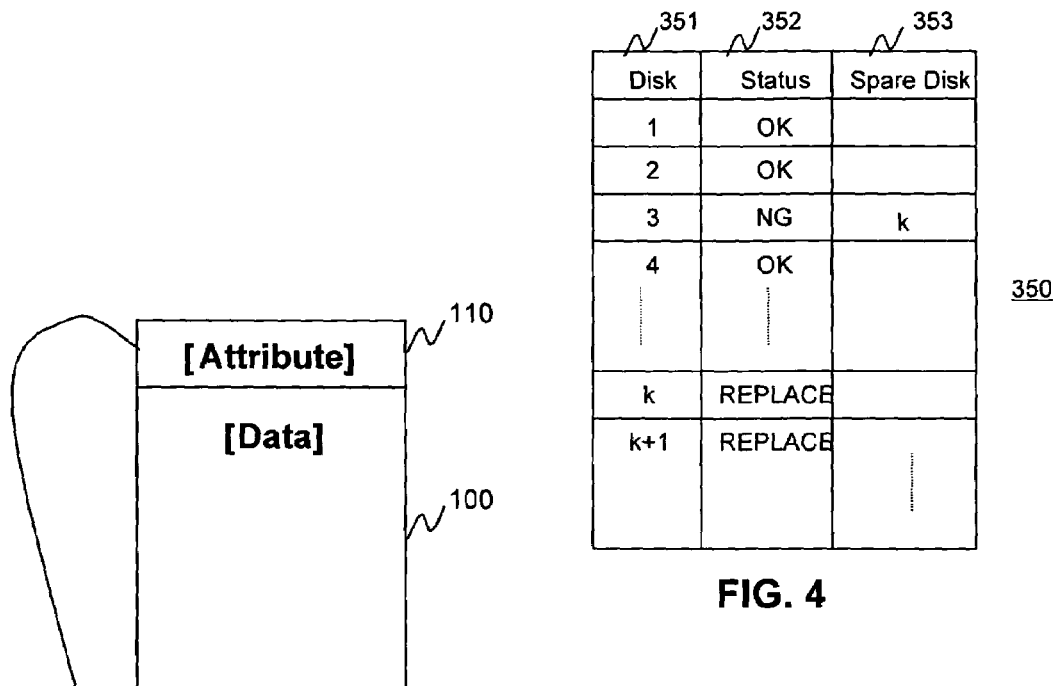
FIG. 4 is a diagram for explaining a disk status table 350 according to an embodiment of the present invention.
FIG. 5 is a diagram illustrating an example of an object including an attribute 110 and data 100 according to an embodiment of the present invention.

A disk status table 350 is illustrated in FIG. 4. The disk status table 350 includes a plurality of entries each including a disk number 351, status information 352 and spare disk information 353. The disk number 351 indicates a disk number which identifies a particular one of the storage devices 31-1 through 31-4. The status information 352 indicates a status of a storage device 31-1 through 31-4 that is specified by the disk number 351. An indication of "OK" as the status 352 indicates that the storage device 31 works normally, "NG" indicates that the storage device 31 has failed, and "REPLACE" indicates that the storage device 31-1 through 31-4 specified by the disk number 351 is a hot standby storage device to be used as a replacement storage device when one of the storage devices 31-1 through 31-4 fails.

Disk controller 20 periodically checks the status of each storage device 31-1 through 31-4, and manages and updates the disk status table 350 as the status of the storage devices 31-1 through 31-4 changes. Thus, when a storage device 31-1 through 31-4 fails, disk controller 20 changes the status of the storage device 31-1 through 31-4 into "NG", and assigns one of the replacement storage devices whose status is "REPLACE" as the replacement storage device.

The spare disk number 353 is the disk number of the storage device assigned by the disk controller 20 as the replacement storage device. Thus, FIG. 4 illustrates a state where the disk controller 20 assigns the storage device 'k', which has the status of REPLACE, as the replacement storage device of the storage device 31-3 having a disk number '3' since the storage device 31-3 has failed.

C. Important Feature of the Invention

FIG. 5 illustrates an example of an important feature of the present invention. As discussed above, the storage system 2 processes I/O requests from the host computer 1-1, 1-2 in accordance with the OSD commands. The host computer 1-1, 1-2 reads/writes data from/to the storage system 2 as an object. The object includes data 100 and attribute (metadata) 110. The attribute 110 contains information regarding the object. An example of the details of the attribute 110 is described below.

Since the size of an object is variable, each object includes information in the attribute thereof regarding the size of the object. Some of the details of an attribute have already been defined by standardization organizations (such as ANSI T-10 Working Draft). However, vendors can define additional attributes in their storage system.

According to the present invention the attribute 110, as shown in FIG. 5, includes information of at least one attribute which is defined according various parameters including attribute page information 111, attribute number 112, and attribute value 113. The attribute page information 111 is used to organize the attributes into pages for identification and reference purposes. Thus, for example, all of the attributes organized into a single page could have similar characteristics. The attribute number 112 is used to uniquely identify an attribute. The attribute value 113 is used to provide various information regarding features or parameters of the object. Thus, the attribute value 113 could, for example, provide as per FIG. 5 a Partition_ID 131 which identifies a partition on the storage device 31-1 through 31-4 within which the object is stored, User_Object$_{13}$ID 132, also referred to as an object ID, which identifies a unique number identifying the object, Username 133 which identifies an username of the object, Used capacity 134 which indicates a size of the object (including attribute), created time 135 which indicates a time that the object was created, an attribute accessed time 136 which indicates a last time the attribute was accessed, an attribute modified time 137 which indicates a last time the attribute was modified, a data accessed time 138 which indicates a last time the data was accessed by the READ command, and a data modified time 139 which indicates a last time the data was modified by one of WRITE, CREATE AND WRITE and APPEND commands. Further details of an object can be found in the document ANSI T-10 Working Draft.

D. Data Placement (Attribute Arrangement)

Figures 6, 7:
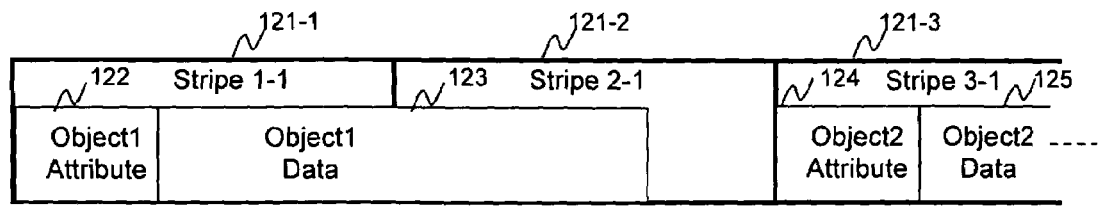
FIG. 6 is a diagram illustrating an example of how the object including the attribute 122 and data 123 is placed (stored) in a stripe 121 of the storage device 31 according to an embodiment of the present invention.
FIG. 7 is a diagram for explaining a logical-physical mapping table 200 according to an embodiment of the present invention.

As described above each object has its own attribute. In addition to data, the attribute is also stored in the storage devices. In the present embodiment, when storing an object in the storage devices 31-1 through 31-4, the attribute is stored first, and then data is stored. FIG. 6 illustrates how the object is stored into the storage devices 31-1 through 31-4. Attribute 122 of object1 is stored in the head of the stripe (1-1) 121-1, and data 123 of object1 is stored just after the attribute. When the size of the object (attribute and data) exceeds the stripe size, the remainder of the object is stored in the next stripe (2-1) 121-2. When the next object, object2, is to be stored, disk controller 20 stores the attribute 124 into the next stripe (3-1) 121-3. Thus, according to the present invention two or more objects are not stored in the same stripe 121-1, 121-2, 121-3.

E. Logical—Physical Mapping:

Disk controller 20 manages the relation between objects and stripes by using the logical-physical (LP) mapping table 200 illustrated in FIG. 7. In the present embodiment, disk controller 20 maintains the LP mapping table 200 in the cache memory 23. But in another embodiment, the LP mapping table 200 may be maintained in the memory 22, and may be stored into some region in the storage devices 31-1 through 31-4 when the power source is turned off.

As per FIG. 7 the LP mapping table 200 includes a plurality of entries each having port 201, LUN 202, partition ID 203, object ID 204 and disk location 205. The port 201 and LUN 202 are used to specify a logical storage device in the storage system 2 as determined by a port, namely host interface 24-1, 24-2, from which an I/O request is received and LU to which the I/O request is directed. The partition ID 203 identifies a partition on the storage device 31-1 through 31-4 within which the object is stored and the object ID 204 is a unique identification number of each object. By specifying the partition ID and the object ID an object can be specified. The disk location 205 indicates in which stripe the object, which is specified with partition ID 203 and object ID 204, is stored. Thus, as per the present invention according to the first row of the LP mapping table 200, the object whose port 201 is 0, LUN 202 is 0, partition ID 203 is 10000 and object ID 204 is 10000 is stored in the stripes 1-1 and 2-1.

The LP mapping table 200 is used to search for the object location in the storage devices 31-1 through 31-4 when the disk controller 20 receives an object read or update (write) request from the host computer 1-1, 1-2. When the I/O request, which includes the object identifier (port number, LUN, partition ID and object ID) come from host computer 1-1, 1-2, the disk controller 20 converts the object identifier into the disk location of the data on the storage devices 31-1 through 31-4 using the LP mapping table 200. Each entry of the LP mapping table 200 is created when an object is created by instruction from the host computer 1-1, 1-2. In some cases, the entry may be updated when the object is updated or the storage devices 31-1 through 31-4 fail.

In the present embodiment, the disk controller 20 also maintains the inverse mapping table of the LP mapping table 200 to specify which disk block contains which object. Thus, FIG. 8 illustrates a physical-logical (PL) mapping table 250. As per FIG. 8 the PL mapping table 250 includes a plurality of entries each having stripe identifier 251, port 252, LUN 253, partition ID 254 and object ID 255. The stripe information 251 identifies a particular stripe by a unique number as a stripe which contains the specified object. The port 252 and LUN 253 are used to specify a logical storage device in the storage system 2 as determined by a port, namely host interface 24-1, 24-2, from which an I/O request is received and a LU to which the I/O request is directed. The partition ID 254 identifies a partition on the storage device 31-1 through 31-4 within which the object is stored and the object ID 255 is a unique identification number of each object. When no object is stored in the identified stripe, value "−1" (0xFFFFFFFF in hexadecimal) is stored in the partition ID 254 and object ID 255. An example of such is illustrated in FIG. 8 for the entry which identifies the stripe 2-4. According to the present invention at the same time as an entry in the LP mapping table 200 is created or updated, the PL mapping table 250 is also created and updated.

In the present embodiment, the disk controller 20 maintains both LP mapping table 200 and PL mapping table 250. However, in another embodiment, the disk controller 20 can, for example, only maintain the LP mapping table 200. In such a case, when the disk controller 20 needs to convert a stripe number into an object ID, the disk controller 20 searches the LP mapping table 200 for the stripe number.

F. Process Flow of I/O Operations

The major operations/commands of OSD commands include, for example, CREATE, WRITE, READ, CREATE AND WRITE, APPEND, GET ATTRIBUTE, and REMOVE commands. The CREATE command is used to allocate one or more objects in the storage device. The key parameters of the WRITE command are the object ID, starting byte address, and length. The WRITE command is used for writing a certain length of data from the specified starting byte address in the object specified by the object ID. Also, the attribute can be changed at the same time when invoking the WRITE command. The key parameters of the READ command are the object ID, starting byte address, and length. The READ command is used for reading a certain length of data from the specified starting byte address in the object specified with the object ID. Also, the attribute can be changed at the same time when invoking the READ command. The CREATE AND WRITE command is a compound operation including both CREATE and WRITE commands. The CREATE AND WRITE command is used to execute a CREATE operation and a WRITE operation in a single command. The APPEND command is used to append a specified length of data after the current object. The GET ATTRIBUTE command is used for retrieving the attribute of an object for use in later processing of the object. The REMOVE command is used for deleting an object in a logical storage device.

Figure 9:
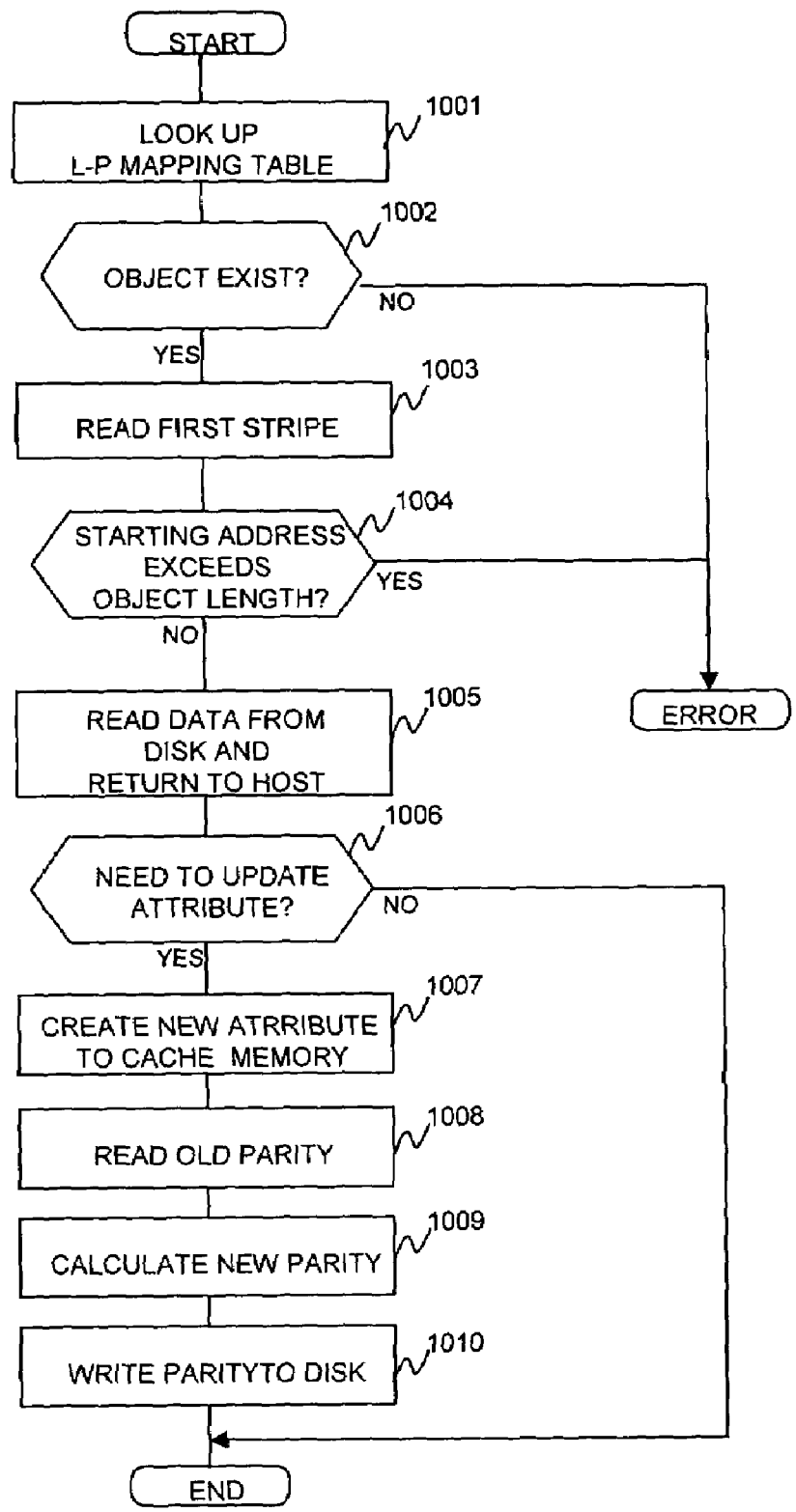
FIG. 9 is a flowchart illustrating the steps performed when the host computer issues the READ or GET ATTRIBUTE command to the storage system according to an embodiment of the present invention.

FIG. 9 is a flow chart describing when the host computer 1-1, 1-2 issues the READ or GET ATTRIBUTE command to the storage system 2. The flow chart illustrated in FIG. 9 can, for example, be implemented by hardware and/or software. If implemented by software each of the steps of the flow chart can, for example, correspond to computer program code or instructions executed by a processor.

As illustrated in FIG. 9 the flow of the process proceeds as follows. In response to the READ or GET ATTRIBUTE command from the host computer 1-1, 1-2, the LP mapping table 200 is looked up to determine in which stripes the specified object is stored (Step 1001). Based on information in the LP mapping table 200, a judgment is made whether the object exists in the storage devices 31-1 through 31-4 (Step 1002). If the object does not exist in the storage devices 31-1 through 31-4, the process returns an error message/code to the host computer 1-1, 1-2. If the object exists in the storage devices 31-1 through 31-4, the process reads the first stripe as identified by the LP mapping table 200 to obtain the attribute of the object (Step 1003). The process then obtains information regarding the length of the object from the attribute that was read in step 1003, and checks whether the starting address specified by the host computer 1-1, 1-2 exceeds the object length (Step 1004). If the starting address exceeds the object length, then the process returns an error message to the host computer 1-1, 1-2. If the starting address does not exceed the object length, then the process reads data of the object from the stripe(s) identified by the LP mapping table 200 and returns the data to the host computer 1-1, 1-2 (Step 1005). Thus, for example, if the object is stored in a plurality of stripes, then data of the object is read from the stripes succeeding the first stripe, and the data is returned to the host computer 1-1, 1-2. However, for example, if the object is stored within a single stripe, then the read operation of this step need not be performed since data of the first stripe has already been read.

Thereafter, the system checks if the attribute should be updated or not (Step 1006). In some cases, the command from the host computer 1-1, 1-2 may contain an instruction to update the attribute. Thus, if the attribute does not need to be updated, then the process ends normally. However, if the attribute is to be updated, then the process updates the attribute as read by step 1003 and stores the updated attribute as part of a new data stripe in the cache memory (Step 1007). When storing the new data stripe, the process does not overwrite the old data stripe that was read at step 1003. Instead, the process stores the new data stripe to a different location from the old data stripe since both the old data stripe and new data stripe are used for generating parity. Since the stripe which contains the attribute is updated, the corresponding parity stripe needs to be updated. Therefore, the system reads the parity stripe corresponding to the first data stripe to calculate parity (Step 1008). The system calculates a new parity by XOR'ing the first data stripe that was read at step 1003, and the updated data stripe (Step 1009). The updated parity is then written to the disk (Step 1010).

Figure 10:
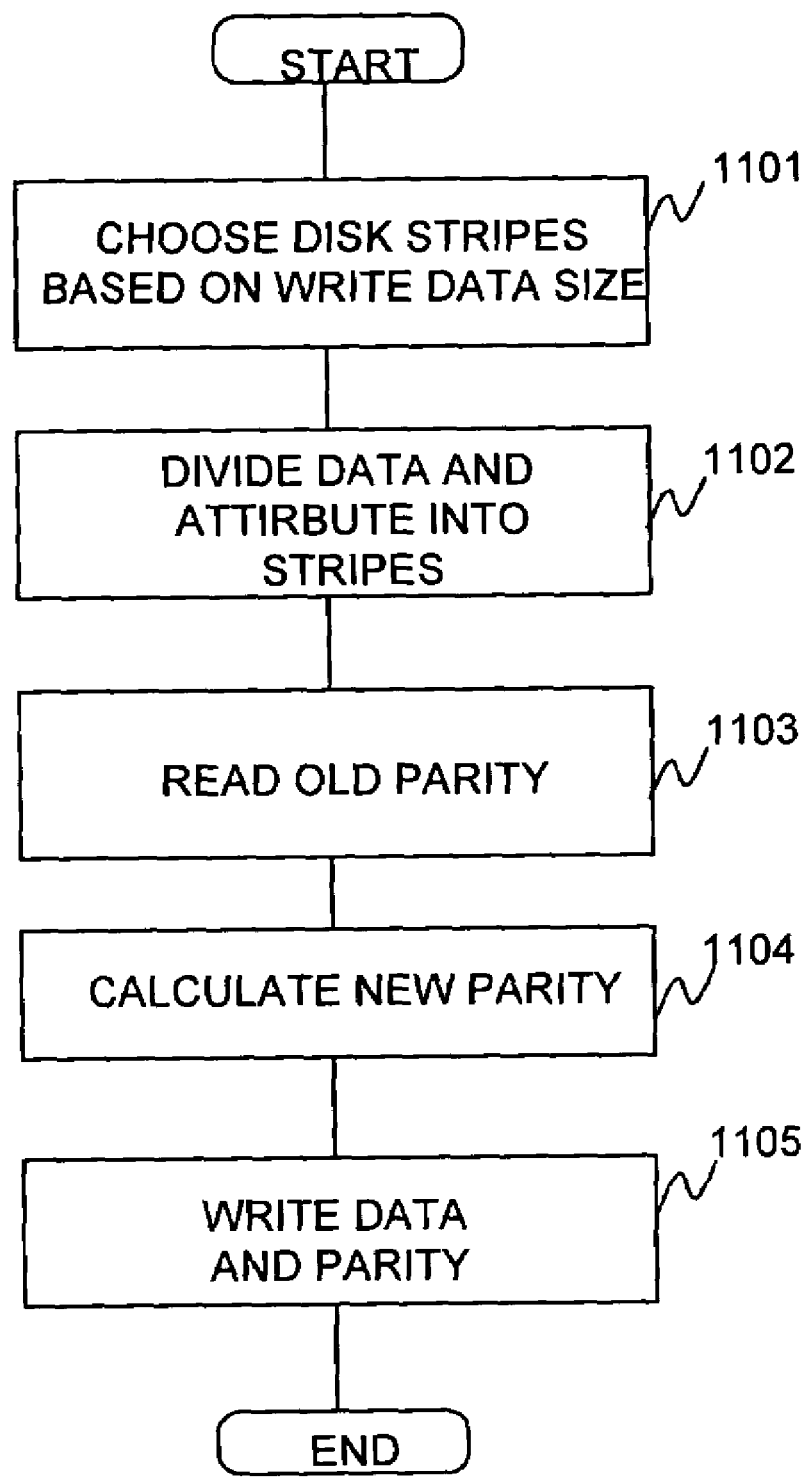
FIG. 10 is a flowchart illustrating the steps performed when the storage system receives a CREATE, or CREATE AND WRITE command from the host computer according to an embodiment of the present invention.

FIG. 10 illustrates a flowchart of when the storage system 2 receives a CREATE, or CREATE AND WRITE command from the host computer 1-1, 1-2. The steps of the flowchart illustrated in FIG. 10 are executed in the CPU 21. The flowchart illustrated in FIG. 10 can, for example, be implemented by hardware and/or software. If implemented by software each of the steps of the flowchart can, for example, correspond to computer program code or instructions executed by a processor, for example, CPU 21.

As illustrated in FIG. 10 the flow of the process proceeds as follows. The process selects unused stripes as indicated by the PL mapping table 250 based on the size of the write data. If the size of the attribute is 10 KB, the size of the write data is 60 KB, and the size of the stripe is 64 KB, the process selects two stripes within which the attribute and data are to be written since the attribute and data to be written to the storage device 31-1 through 31-4 is 70 KB (Step 1101). Thus, when the total size of the attribute and data exceeds the stripe size, the process divides the attribute and data to be stored into a plurality of data blocks which are stored into a plurality of stripes (Step 1102). Therefore, for example, assuming the size of the attribute is 10 KB, the size of the write data is 60 KB, and the size of the stripe is 64 KB, the process creates a 64 KB data block, which includes the attribute and a portion of the data, and a 6 KB data block, which includes the remaining portion of the data.

Thereafter the process reads a parity stripe corresponding to the selected data stripes (Step 1103). For example, if the RAID configuration is similar to that shown in FIG. 2, and if the stripe 3-4 is selected in step 1101, parity stripe P4 is read. In other words the parity stripe Px (x=1, 2, 3, . . . ) is read when the data stripe y-x (y=1, 2, 3, . . . ) is selected. If one or more data stripes are selected, the corresponding parity stripes are to be read. For example, if the data stripes 3-4 and 3-5 are selected, parity stripes P4 and P5 should be read. However, for example, if the data stripes 3-4 and 4-4 are selected, only parity stripe P4 should be read since P4 is the corresponding parity of the data stripes 3-4 and 4-4. Then the process calculates a new parity from the divided data blocks and parity stripes (Step 1104). The parity stripe is calculated by the following formula:

$$Px'=(\text{data stripe}y\text{-}x)XOR(Px)$$

In the traditional RAID system, when calculating parity, the old data block must be read and parity calculated. But in the present invention, when creating or appending an object, the disk controller 20 assumes that there is no data object in the data stripes. Thus, disk controller 20 instead assumes that zero data is stored. The process then stores the new parity and data stripes in the storage devices 31-1 through 31-4 (Step 1105).

Figure 11:
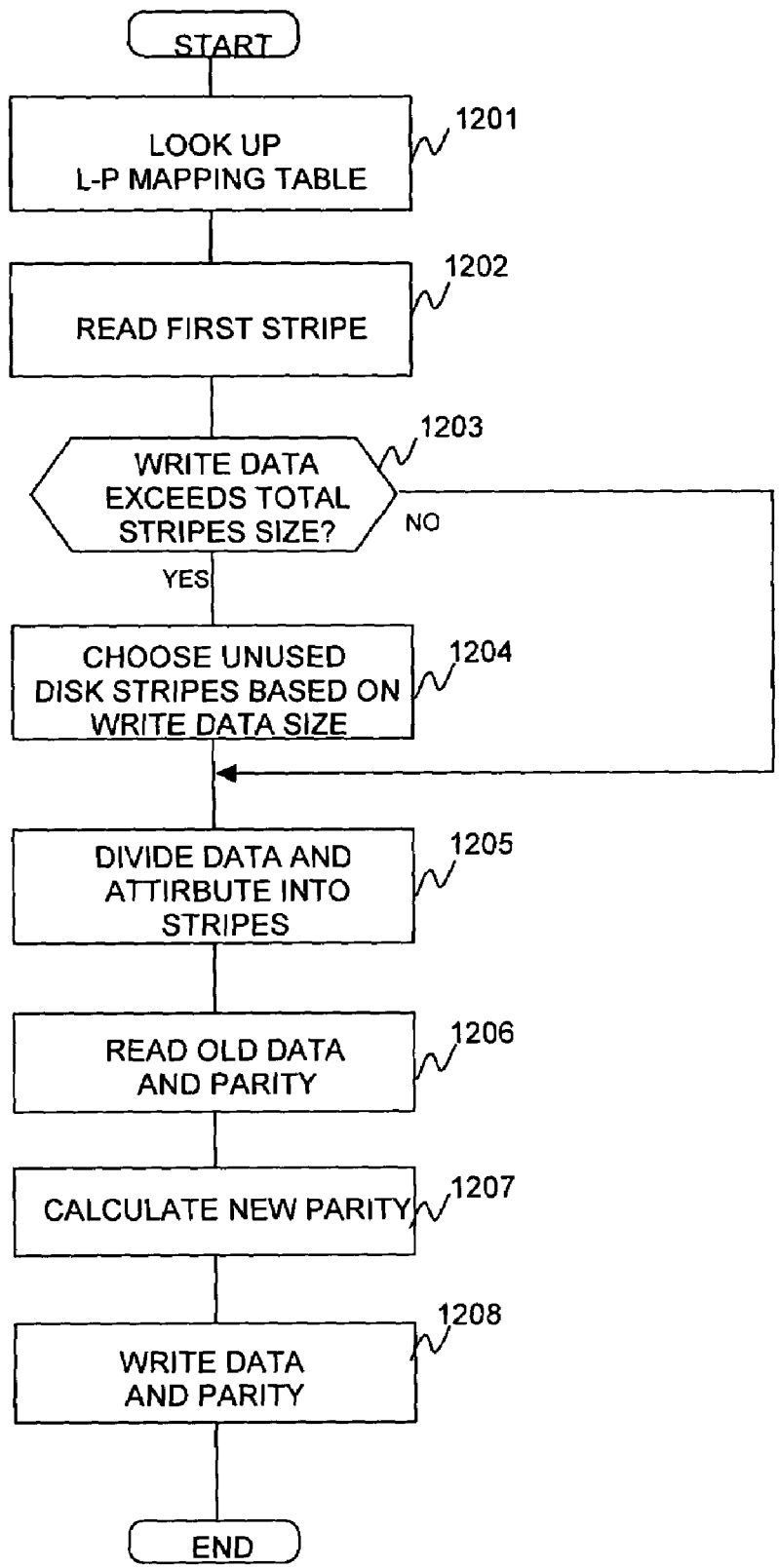
FIG. 11 is a flowchart illustrating the steps performed when the storage system receives a WRITE, or APPEND command from the host computer according to an embodiment of the present invention.

FIG. 11 illustrates a flowchart of when the storage system 2 receives a WRITE or APPEND command from the host computer 1-1, 1-2. The steps of the flowchart are executed in the CPU 21. The flowchart illustrated in FIG. 11 can, for example, be implemented by hardware and/or software. If implemented by software each of the steps of the flowchart can, for example, correspond to computer program code or instructions executed by a processor, for example, CPU 21.

As illustrated in FIG. 11 the flow of the process proceeds as follows. In response to the WRITE or APPEND command from the host computer 1-1,1-2, the LP mapping table 200 is looked up to determine in which stripes of the storage devices 31-1 through 31-4 the specified object is stored (Step 1201). The process reads the first data stripe where the object is stored to get the attribute so as to determine the object length (Step 1202). The process then judges whether the write data exceeds the current length of the data stripes (Step 1203). For example, when the current object length, including attribute and data, is 70 KB and each data stripe size is 64 KB, the object occupies two data stripes (128 KB). If 70 KB of data is to be appended to the current object, then the total object length becomes 140 KB. Thus, one additional data stripe is needed to store the appended data. If the total object length to be stored exceeds the total stripe size, the process proceeds to step 1204. If the object length does not exceed the total stripe size, the process proceeds to step 1205. If the total object length to be stored exceeds the total stripe size, then the process finds one or more unused stripes as indicated by the PL mapping table 250 based on the write data size and updates the LP mapping table 200 and PL mapping table 250 (Step 1204). The process determines which data stripes are to be updated based on the starting address and data length in the WRITE command, and divides the data and attribute to generate updated data stripes which can be written to the appropriate stripes (Step 1205). Thereafter, the process reads the data stripes which are to be updated as per step 1205 and reads the corresponding parity stripes (Step 1206). The stripes that are to be appended do not need to be read. The process calculates new parity stripes from the read data stripes as per step 1206 and the updated data stripes as per step 1205 (Step 1207). The process writes updated data and the calculated parity to the storage devices 31-1 through 31-4 (Step 1208).

Figure 12:
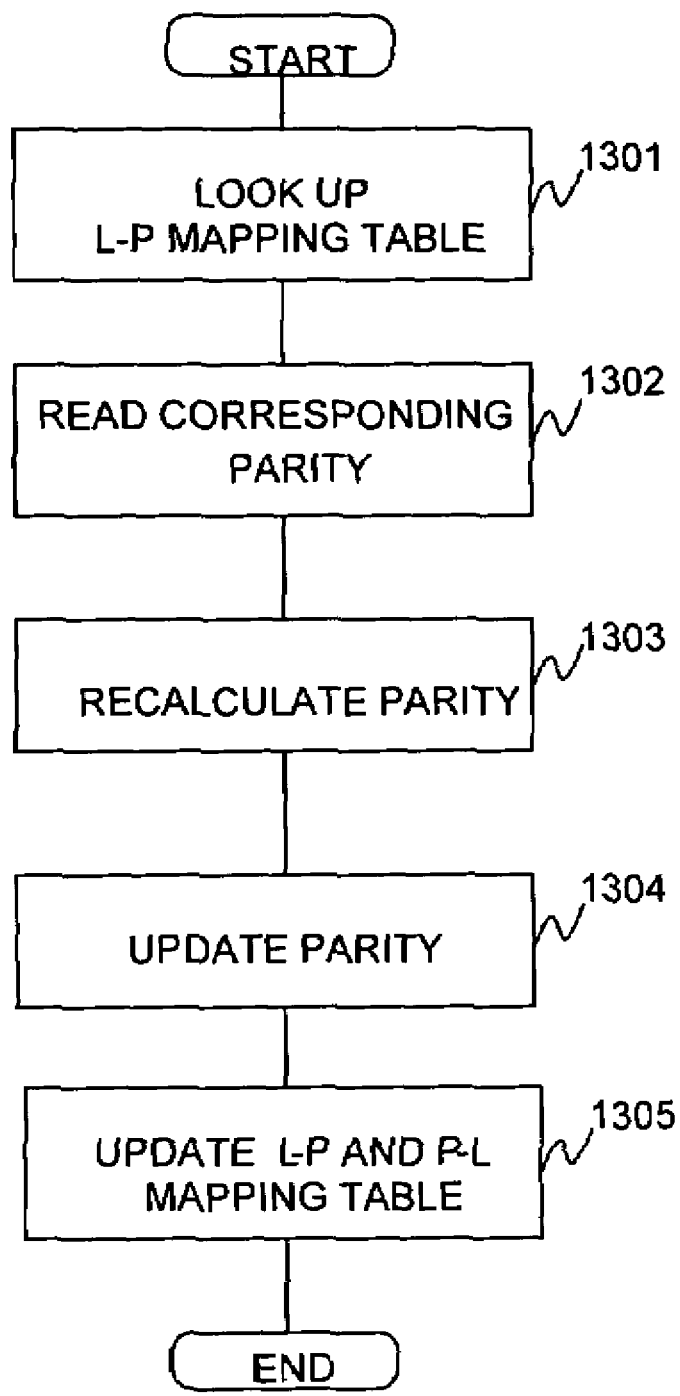
FIG. 12 is a flowchart illustrating the steps of deleting the object in the logical storage device when the REMOVE command is issued from the host computer 1 according to an embodiment of the present invention.

FIG. 12 illustrates the process flow of deleting the object in the logical storage device when the REMOVE command is issued from the host computer 1-1, 1-2. The flowchart illustrated in FIG. 12 can, for example, be implemented by hardware and/or software. If implemented by software each of the steps of the flowchart can, for example, correspond to computer program code or instructions executed by a processor.

As illustrated in FIG. 12 the flow of the process proceeds as follows. In response to the REMOVE command from the host computer 1-1, 1-2, the LP mapping table 200 is looked up to determine in which stripes of the storage devices 31-1 through 31-4 the specified object is stored (Step 1301). The process reads the parity stripes corresponding to the object (Step 1302). The process recalculates parity (Step 1303). The parity calculation formula is as follows:

In the traditional RAID system, when the data D is updated into D', the corresponding parity P is updated to P':

$$P'=(D)XOR(D')XOR(P)$$

But the storage system of the present invention does not overwrite the data stripes Dx when the object is deleted. Instead, the storage system assumes that the data is virtually re-written to zero and parity Px' is calculated in accordance with the assumption:

$$Px'=(Dx)XOR(0)XOR(Px)$$

That is, it is equal to the following formula:

$$Px'=(Dx)XOR(Px)$$

Using the recalculated parity the process updates parity (Step 1304). The process then updates the LP mapping table 200 and PL mapping table 250 (Step 1305). Specifically, the process removes (deletes) the entry of the object to be deleted in the LP mapping table 200, and resets the partition ID 254 and object ID 255 in the PL mapping table 250 to '-1' (0xFFFFFFFF in hexadecimal) corresponding to the deleted object.

G. Data Reconstruction:

When one of the storage devices 31-1 through 31-4 fails, the storage system 2 can, for example, recover the data by using a RAID technique. Unlike the traditional RAID technique, the storage system 2 does not need to recover all data blocks in the storage devices 31-1 through 31-4. The storage system 2 need only recover the data stripes where the object is stored, and the parity stripes. Therefore, to recover the failed storage device 31-1 through 31-4, the storage system 2 creates a list of stripes that are to be recovered, and then recovers the stripes.

FIG. 13 is an example of the list of stripes that are to be recovered as created by the storage system. The list as shown in FIG. 13 is hereinafter called a disk reconstruction bitmap 400. As per FIG. 13 the disk reconstruction bitmap 400 includes a plurality of entries each including stripe 401 which indicates the number of a stripe, recovery 402 which is a flag indicating whether the indicated stripe is to be recovered by the flag being ON (1) or not recovered by the flag being OFF (0), and done 403 which is a flag indicating whether the data reconstruction operation of the stripe has completed.

Figure 14:
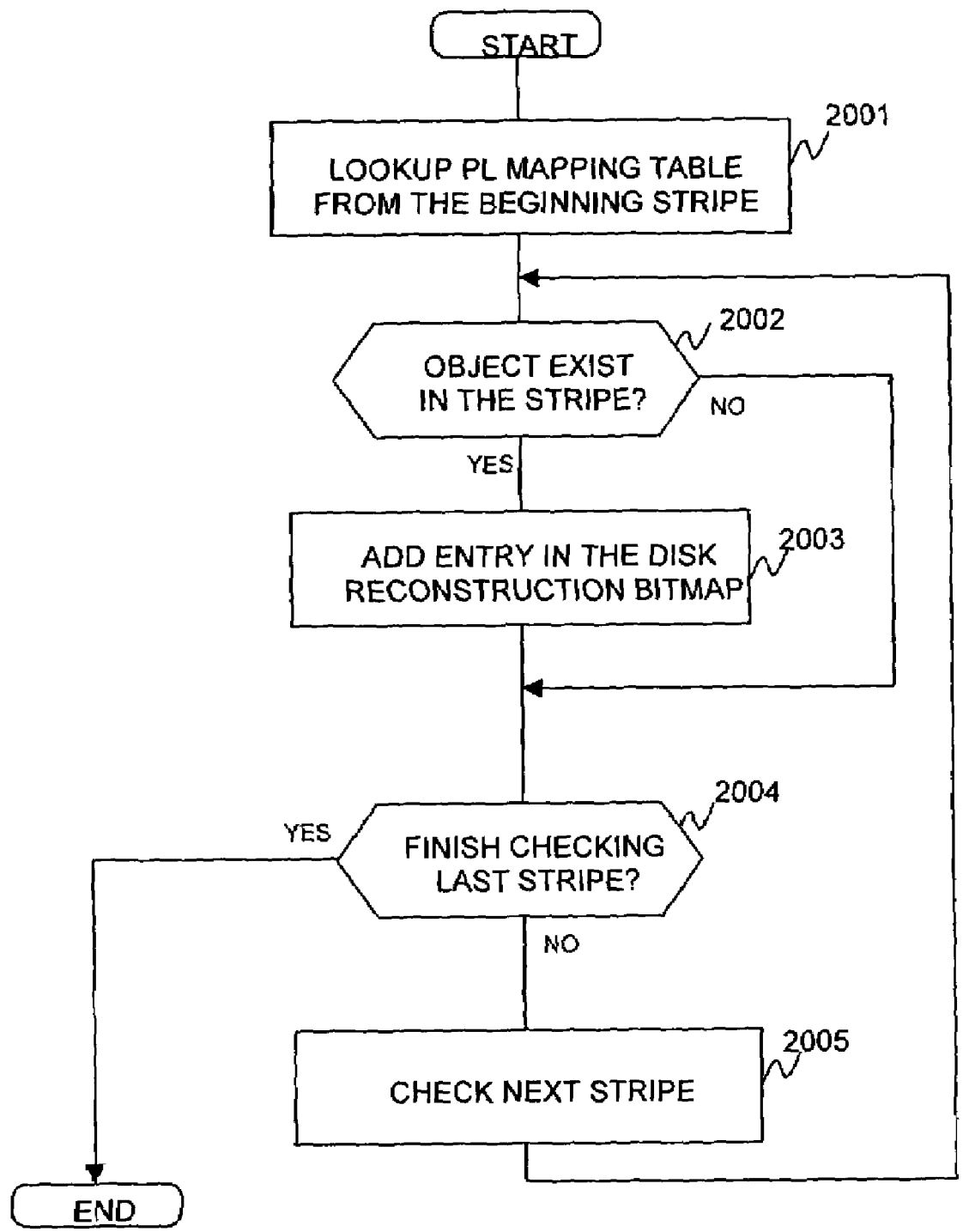
FIGS. 14 and 15 are flowcharts illustrating the steps of reconstructing data according to an embodiment of the present invention.
Figure 15:
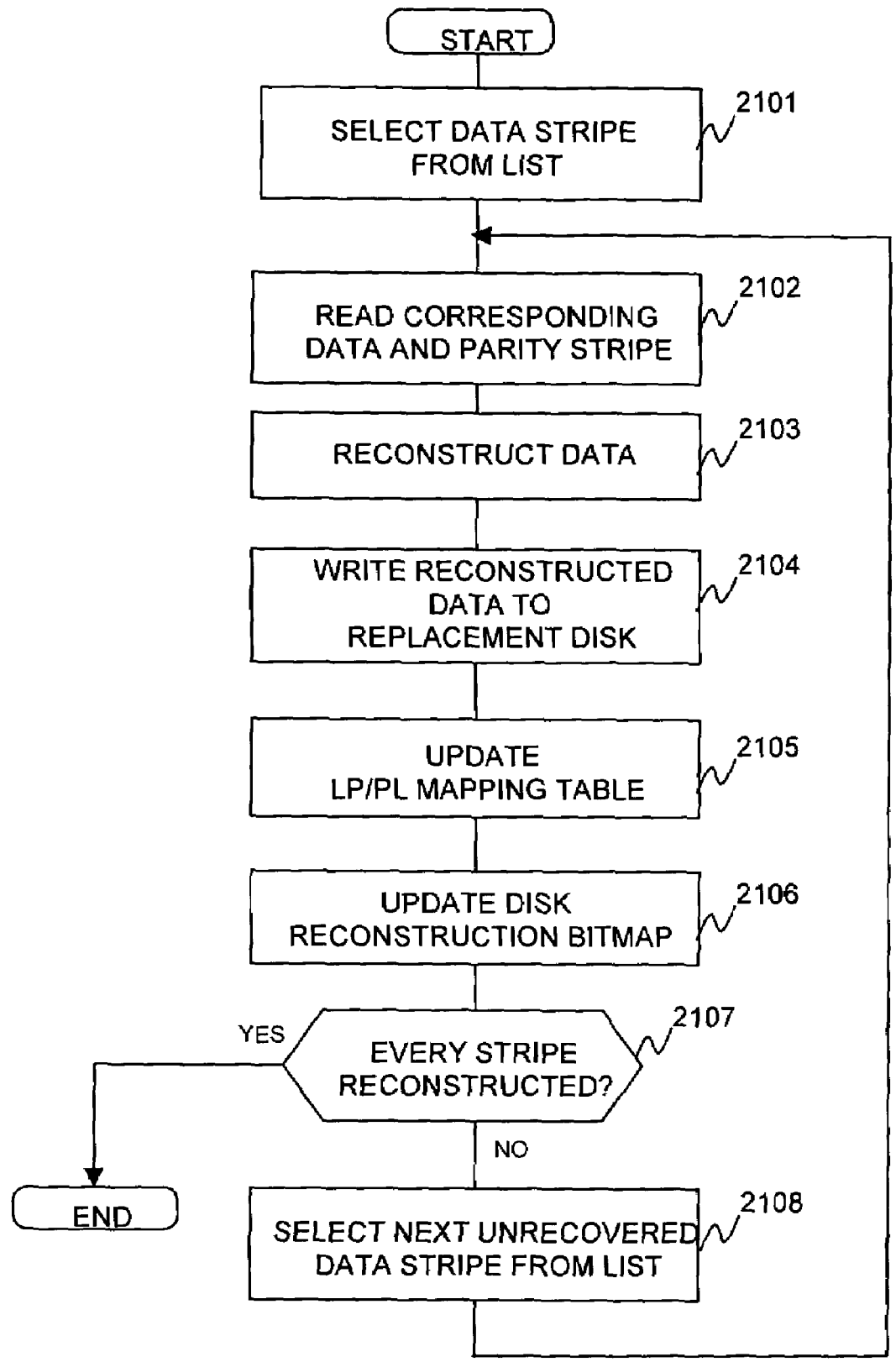

The flowchart in FIG. 14 illustrates the process to create the disk reconstruction bitmap 400, and the flowchart in FIG. 15 illustrates the process to reconstruct data and parity stripes using the RAID technique. The flowcharts illustrated in FIGS. 14 and 15 can each, for example, be implemented by hardware and/or software. If implemented by software each of the steps of the flowcharts can, for example, correspond to computer program code or instructions executed by a processor.

FIGS. 14 and 15 illustrate the process flow of the data reconstruction process according to the present embodiment. When a storage device 31-1 through 31-4 fails, disk controller 20 starts a disk recovery process. The disk recovery process includes the following tasks:

1. Assign the replacement disk to replace the failed storage device. This is done by updating the disk status table 350.
2. Start the process to create the disk reconstruction bitmap 400 as per the flowchart illustrated in FIG. 14 (data reconstruction pre-processing).
3. When the process in FIG. 14 completes, the process to reconstruct data and parity stripes using the RAID technique starts, which is described in FIG. 15 (data reconstruction main process).

When recovering data, tasks 1-3 as described above are executed in the order indicated above.

The process illustrated in FIG. 14 proceeds as follows. Upon occurrence of a failure, the process selects the first entry in the PL mapping table 250 (Step 2001). Thus, for example, when storage device 31-2 as illustrated in FIG. 2 fails, the process checks the first entry of the PL mapping table 250 regarding the storage device 31-2, namely the entry for the stripe having a stripe number of 2-1. The process then checks if an object is stored in the first stripe 2-1 (Step 2002). If an object is not stored in the first stripe 2-1, then the process proceeds to step 2004. If an object is stored in the first stripe 2-1, then the process sets the recovery flag 402 to ON corresponding to the stripe in the disk reconstruction bitmap 400 (Step 2003). Subsequent to setting the recovery flag to ON as per step 2003 or if an object is not stored in the first stripe 2-1 as per step 2002, then a check is made as to whether all stripes have been checked (Step 2004). If all stripes have been checked, then the process ends. If all stripes have not been checked, then the next stripe is checked and the process proceeds to step 2002 (Step 2005). Since the parity stripes have to be reconstructed, all recovery 402 flags corresponding to the parity stripes are set to ON in the disk reconstruction bitmap of FIG. 13.

The process illustrated in FIG. 15 proceeds as follows. Based on the values indicated in the disk reconstruction bitmap 400, the process selects a first stripe whose recovery flag 402 is ON, indicating that the stripe must be data reconstructed (Step 2101). The process reads the data and parity stripes corresponding to the selected stripe in step 2101 (Step 2102). The process then reconstructs the data (or parity) stripe based on the read data in step 2102 (Step 2103). The process writes the reconstructed data to the replacement storage device (Step 2104). The process updates the LP mapping table 200 and the PL mapping table 250 (Step 2105). Thus, for example, when the storage device 31-3 fails and storage device k is selected as the replacement device, the disk location entry 205 in the LP mapping table 200 and stripe entry 251 in the PL mapping table 250 are updated. If stripe 3-1 is recovered, the stripe 3-1, that is used for the object whose partition ID is 10001 and object ID is 10000, is updated to k-1. The process updates disk reconstruction bitmap 400 and sets "1" in the done entry 403 (Step 2106). The process then checks if every stripe has been reconstructed (Step 2107). If every stripe has been reconstructed, the process ends. If every stripe has not been reconstructed, the process selects the next stripe in the disk reconstruction bitmap 400 that has not been recovered and proceeds back to step 2101 (Step 2108).

In the embodiment described above, the data reconstruction is done in each stripe, but in another embodiment, a plurality of stripes of data can be reconstructed at a time. Thus, for example, 10 stripes can be constructed at a time.

H. I/O Operation During Data Reconstruction

In the present embodiment, the storage system 2 can accept I/O read or write requests from the host computer 1-1, 1-2 during data reconstruction. Below are described how the I/O requests are processed during data reconstruction.

Figure 16:
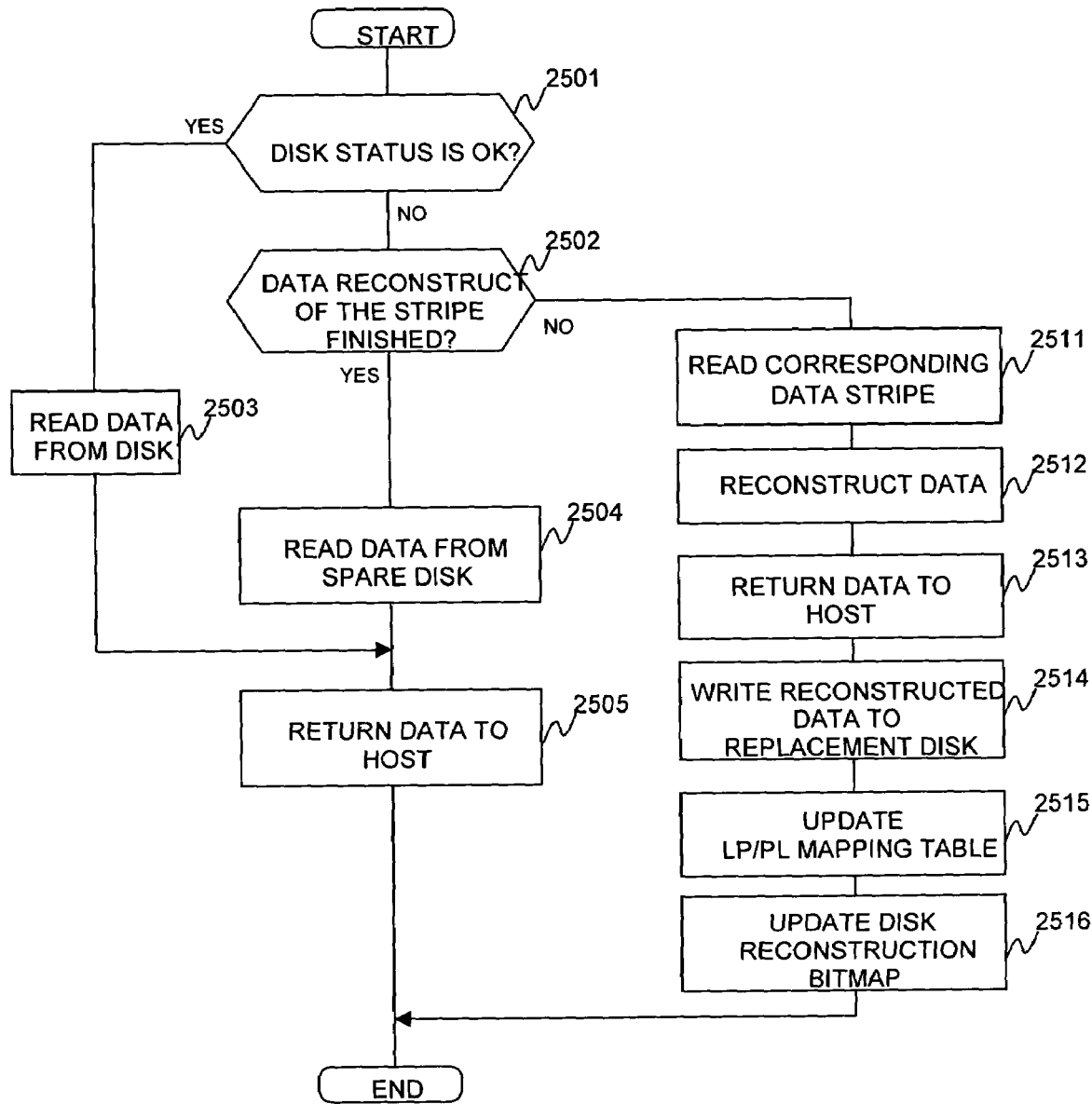
FIG. 16 is a flowchart illustrating the steps performed by the disk controller 20 when it reads data from the storage devices according to an embodiment of the present invention.

FIG. 16 illustrates the flowchart of a process performed by the disk controller 20 when it reads data from the storage devices 31-1 through 31-4. The process corresponds to step 1005 in FIG. 9. When the read process performed by the disk controller 20 starts to read data from a storage device 31-1 through 31-4 at step 1005, the process in FIG. 16 starts. The flowchart illustrated in FIG. 16 can, for example, be implemented by hardware and/or software. If implemented by software each of the steps of the flowcharts can, for example, correspond to computer program code or instructions executed by a processor.

The process illustrated in FIG. 16 proceeds as follows. The process checks the disk status table 350 to determine if a storage device (disk) 31-1 through 31-4 to be accessed is working normally or has failed (Step 2501). If the disk is working normally, the process proceeds to step 2503. If the disk has failed, the process proceeds to step 2502. If the disk has failed, then the process checks the disk reconstruction bitmap 400 to determine whether the stripe to be accessed has finished reconstructing data (Step 2502). If the stripe has finished reconstructing data, the process proceeds to step 2504. If the data reconstruction has not finished, the process proceeds to step 2511.

If the disk is working normally, the process reads data from the disk (Step 2503). If the data reconstruction has finished, the process reads data from the replacement disk (Step 2504). The process checks the disk status table 350 and determines which storage device to access. For example, when the process tries to access disk '3', it checks the disk status table 350 and switches the access into disk 'k', since the replacement storage device is determined to be disk 'k'. The process returns the read data to the host computer 1-1, 1-2 (Step 2505). If the data has not been reconstructed, the process reads the corresponding stripes from other storage devices (Step 2511). Using the read data at step 2511, the process reconstructs data (Step 2512). The process returns the reconstructed data to host computer 1-1, 1-2 (Step 2513). The process writes the reconstructed data into the replacement storage device (Step 2514). The process updates the LP mapping table 200 and the PL mapping table 250 (Step 2515). Step 2515 is the same as step 2105 as per FIG. 15. Thereafter the process updates the disk reconstruction bitmap 400 (Step 2516).

Figure 17:
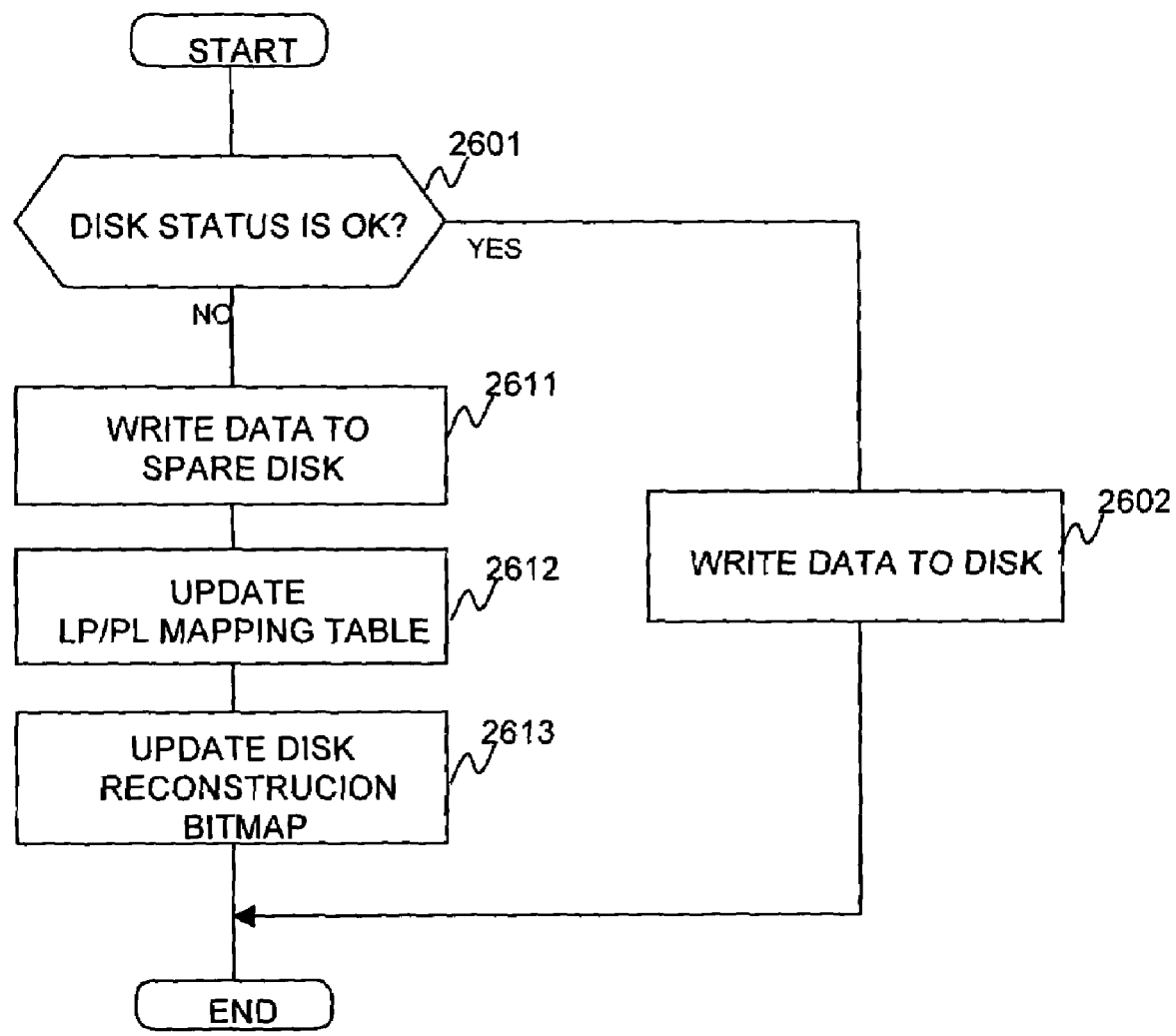
FIG. 17 is a flowchart illustrating the steps performed by the disk controller 20 when it writes data to the storage devices according to an embodiment of the present invention.

FIG. 17 illustrates a flowchart of the process performed by the disk controller 20 when it writes data to the storage device. The process corresponds to the step 1105 in FIG. 10, step 1208 in FIG. 11, and step 1304 in FIG. 12. When the write process starts to write data from disk at step 1005, the process in FIG. 17 starts. The flowchart illustrated in FIG. 17 can, for example, be implemented by hardware and/or software. If implemented by software each of the steps of the flowcharts can, for example, correspond to computer program code or instructions executed by a processor.

The process illustrated in FIG. 17 proceeds as follows. The process checks the disk status table 350 to determine whether the disk to be accessed is working normally or has failed (Step 2601). If the disk is working normally, the process proceeds to step 2602. If the disk is not working normally and has failed, the process proceeds to step 2611.

If the disk is working normally, the process writes data to the designated storage device (Step 2602). If the disk is not working normally and has failed, the process writes data to the replacement storage device (Step 2611). The process updates the LP mapping table 200 and PL mapping table 250 (Step 2612). Step 2612 is the same as step 2105. The process updates the disk reconstruction bitmap 400 (Step 2613). Step 2613 is Step 2613 the same as step 2516.

II. $2^{nd}$ Embodiment

The structure of the storage system in the second embodiment is the same as that of the first embodiment. The difference between the $1^{st}$ and the $2^{nd}$ embodiments is in the data reconstruction process.

In a storage system when a large number of I/O requests are processed, and when data is appended to an object, the appended data is not always placed in adjacent stripes. The objects may, for example, be placed in isolated stripes. Placing the objects in isolated stripes in this manner can cause performance degradation of the storage system in accessing the objects. In the $2^{nd}$ embodiment, the storage system attempts to relocate the isolated stripes so that every stripe in the same storage device constructing an object is placed in adjacent locations when the data reconstruction process is executed.

Figures 18, 19:
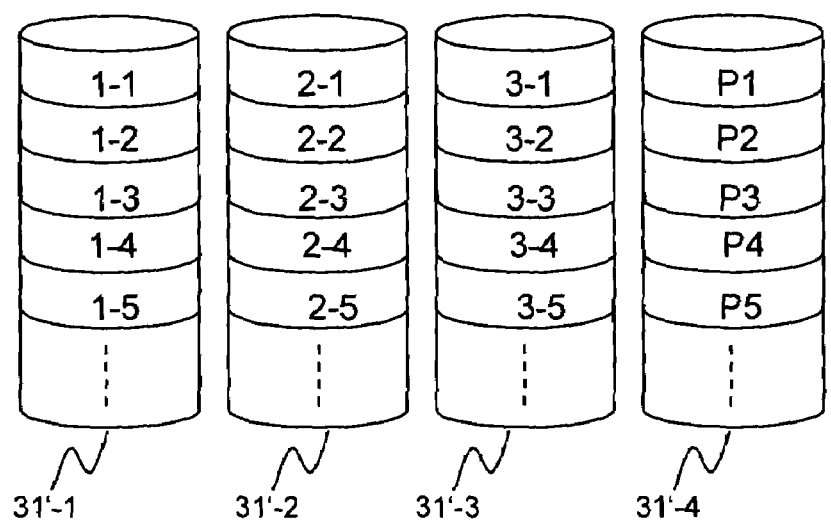
FIG. 18 is a diagram illustrating the layout of storage devices implementing a RAID configuration according to another embodiment of the present invention.
FIG. 19 is a diagram for explaining a logical-physical mapping table 200' according to another embodiment of the present invention.

FIG. 18 illustrates an example of a RAID configuration of the $2^{nd}$ embodiment. This RAID configuration is in accordance with RAID-4 architecture. The following description is based on the RAID-4 configuration. However, the following method is also applicable to other RAID configurations, such as RAID-5.

FIG. 19 is a logical-physical (LP) mapping table 200' of the $2^{nd}$ embodiment having a plurality of entries. Each entry includes port 201, LUN 202, partition ID 203, object ID 204 and disk location 205 the same as the LP mapping table 200 of the $1^{st}$ embodiment.

FIG. 20 is a physical-logical (PL) mapping table 250' of the $2^{nd}$ embodiment having a plurality of entries. Each entry includes stripe 251, port 252, LUN 253, partition ID 254, and object ID 255 the same as the PL mapping table 250 of the $1^{st}$ embodiment.

In the $1^{st}$ embodiment, when the data in the failed storage device is reconstructed, the reconstructed data that was in the X-th stripe (stripe number 'X') in the failed storage device is placed into the same stripe number as the stripe in the replacement storage device. However, in the $2^{nd}$ embodiment, to gather the stripes in a storage device into adjacent locations, the reconstructed data may be placed in different locations than the locations in the original storage device.

FIG. 21 is a disk reconstruction bitmap 400' that the storage system 2 in the $2^{nd}$ embodiment maintains. In the disk reconstruction bitmap 400', stripe 401' indicates the stripe number. The stripe 401' is almost the same as the stripe 401 in the $1^{st}$ embodiment. However, in the $2^{nd}$ embodiment, included are only stripes of data that is to be reconstructed. New location 402' indicates a new location for the reconstructed data identified in the stripe 401'. For example, the second row 405' indicates data that was in stripe 34 that is to be moved to a new location k-2, namely stripe number 2 in the disk k. Done flag 403' is the same as the Done flag 403 in the $1^{st}$ embodiment. Parity reconstruction bit 404' indicates when set that the parity stripes corresponding to the stripes indicated by the stripe 401' and the new location 402' have to be reconstructed. For example, the second row 405' indicates that the parity stripe P4 corresponding to the stripe 3-4 (indicated by the stripe 401') and the parity stripe P2 corresponding to the stripe k-2 (indicated by the new location 402') need to be reconstructed.

Below is a description of the data reconstruction process. Same as the $1^{st}$ embodiment, the disk recovery process first assigns the replacement disk instead of the failed storage device, second starts the process to create the list of stripes that are to be recovered (data reconstruction pre-processing), and third reconstructs data and parity stripes using the RAID technique (data reconstruction main process).

Figure 22:
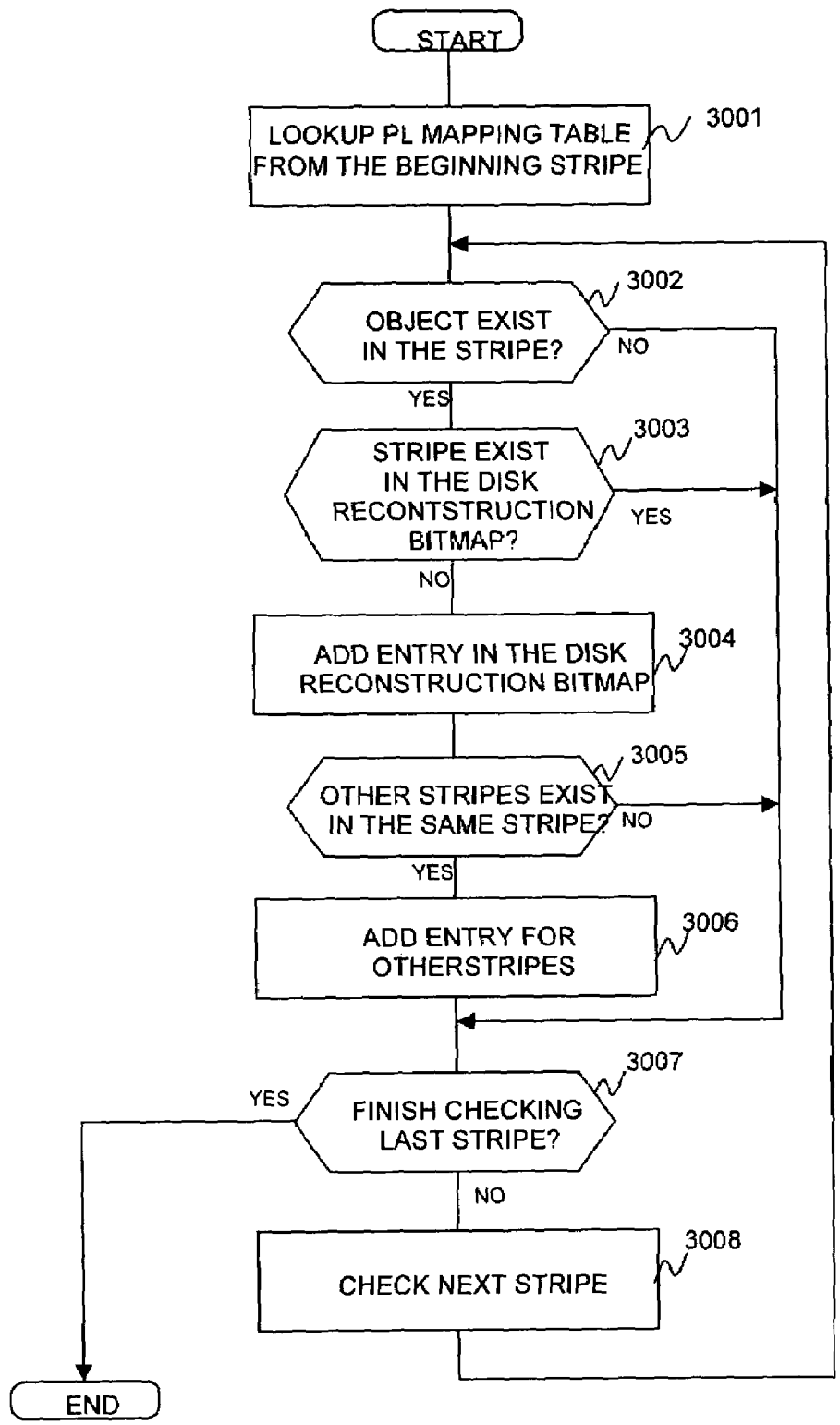
FIGS. 22 and 23 are flowcharts illustrating the steps of reconstructing data according to another embodiment of the present invention.

Below is an explanation of the flowchart of the data reconstruction pre-processing as illustrated in FIG. 22. The flowchart in FIG. 22 corresponds to the flowchart in FIG. 14 of the $1^{st}$ embodiment. The flowchart illustrated in FIG. 22 can, for example, be implemented by hardware and/or software. If implemented by software each of the steps of the flowcharts can, for example, correspond to computer program code or instructions executed by a processor.

The process illustrated in FIG. 22 proceeds as follows. The process selects the first entry in the PL mapping table 250' (Step 3001). The process checks if an object is stored in the stripe (Step 3002). If an object is stored in the stripe, then the process proceeds to step 3003. If an object is not stored in the stripe, then the process proceeds to step 3007. If an object is stored in the stripe, then the process checks if the stripe already exists in the disk reconstruction bitmap 400' (Step 3003). If the stripe exists in the disk reconstruction bitmap 400', then the process proceeds to step 3007. If the stripe does not exist in the disk reconstruction bitmap 400', then the process adds an entry corresponding to the stripe to the disk reconstruction bitmap 400' (Step 3004). Thereafter the process checks if there are other stripes constructing the same object in the same storage device by checking the Disk Location field 205 in the LP mapping table 200' (Step 3005). For example, when the stripe 3-1 is checked at step 3002, the process looks up the object identifier, port ID, LUN, partition ID and object ID of the stripe 3-1, then checks the Disk Location field 205 corresponding to the object identifier. If the disk location field 205 is like the same field in FIG. 19, then the process can detect that another stripe 3-4 exists in the same failed storage device. If there are other stripes, then the process proceeds to step 3006. If there are not any other stripes, then the process proceeds to step 3007. If there are other stripes, then the process adds the row corresponding to the stripe that was detected at step 3005 to the disk reconstruction bitmap 400' (Step 3006). The process then determines if all of the stripes have been checked (Step 3007). If all stripes have been checked, the process ends. If all stripes have not been checked, then the process checks the next stripe and proceeds back to step 3002 (Step 3008).

When the parity storage device is to be reconstructed, disk controller 20 does not execute the process. Instead, the disk controller 20 executes the process described in the 1$^{st}$ embodiment.

Figure 23:
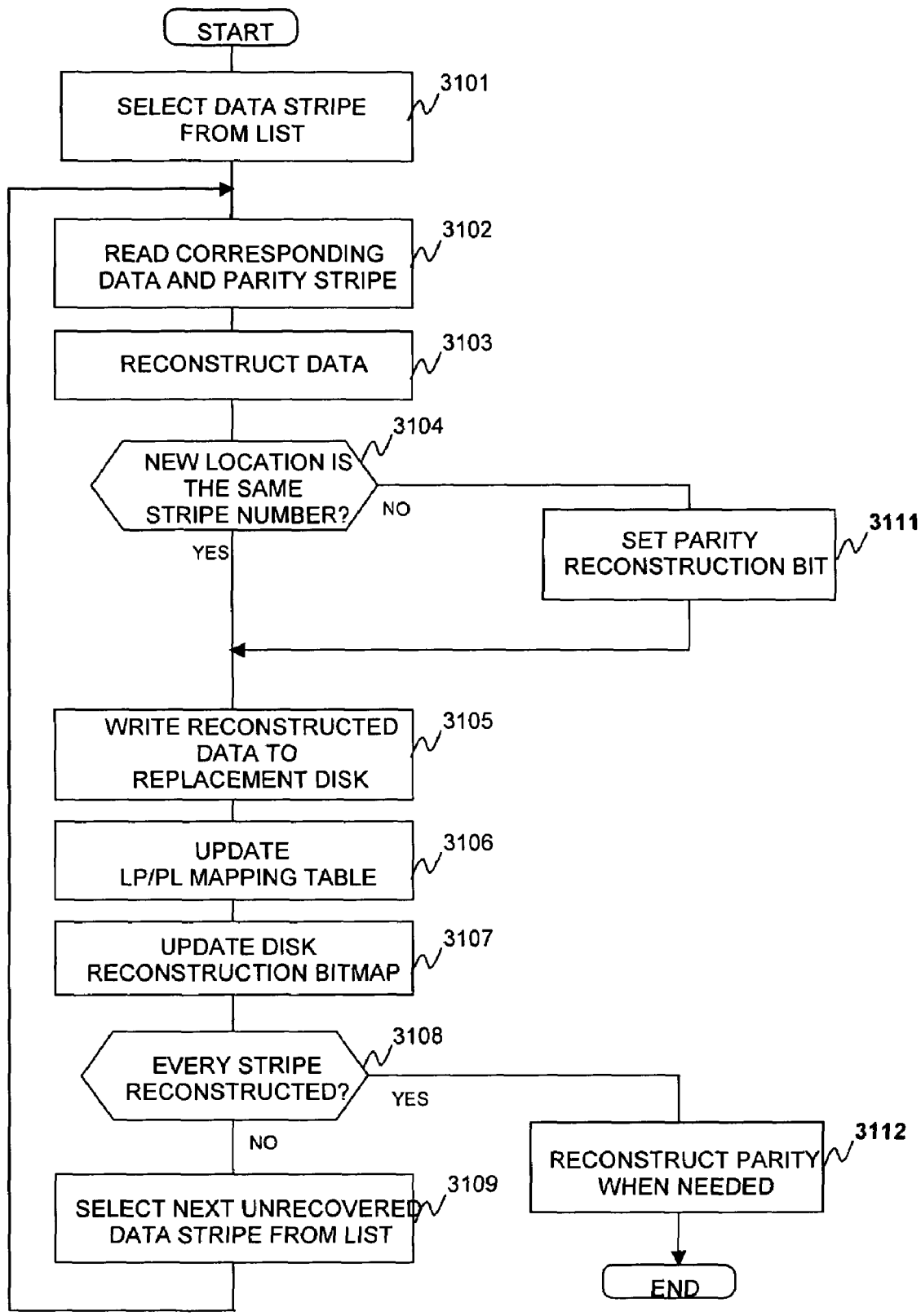

Below is the explanation of the flowchart in FIG. 23. The flowchart illustrated in FIG. 23 can, for example, be implemented by hardware and/or software. If implemented by software each of the steps of the flowcharts can, for example, correspond to computer program code or instructions executed by a processor.

The process illustrated in FIG. 23 proceeds as follows. The process selects the first stripe number in stripe 401' in the disk reconstruction bitmap 400' (Step 3101). Step 3101 is similar to step 2101 in FIG. 15 of the 1$^{st}$ embodiment. The process reads the data and parity stripes corresponding to the detected stripe in step 3101 (Step 3102). The process reconstructs the data (or parity) stripe based on the read data in step 3102 (Step 3103). The process compares the stripe number of the stripe 401' with the new location field 402' in the disk reconstruction bitmap 400' (Step 3104). If the stripe number is the same, then the process proceeds to step 3105. If the stripe number is not same, then the process proceeds to step 3111.

If the stripe number is the same, then the process writes the reconstructed data to the replacement disk (Step 3105). The process updates the LP mapping table 200' and the PL mapping table 250' (Step 3106). When the disk 3 fails and disk k is selected as the replacement device, the disk location entry 205' in the LP mapping table 200' and stripe entry 251' in the PL mapping table 250' is updated. If stripe 3-1 is recovered, the stripe 3-1, that is used for the object whose partition ID is 10001 and object ID is 10000, is updated to k-1 based on information of the new location field 402' in the disk reconstruction bitmap 400'. The process updates disk reconstruction bitmap 400' (Step 3107). Specifically the process sets "1" in the done column 403. The process checks if every stripe has been reconstructed (Step 3108). If every stripe has been reconstructed, then the process proceeds to step 3112. If every stripe has not been reconstructed, then the process proceeds to step 3109. The process then selects the next stripe in the disk reconstruction bitmap 400' that has not been recovered (Step 3109) and proceeds back to step 3102.

If the stripe number is not same as per step 3104, then the process sets parity reconstruction bit 404' on the corresponding stripe (Step 3111). As for the rows in the disk reconstruction bitmap 400' that the parity reconstruction bit 404' is set (it means that the corresponding parity stripes have to be reconstructed), the corresponding parity stripes are reconstructed in step 3112. After every stripe has been reconstructed, the process checks the parity reconstruction bit 404' in the data reconstruction bitmap 400', then reconstructs the corresponding parity stripes. For example, in the second row of the disk reconstruction bitmap 400', parity reconstruction bit 404' is set since the data stripe 3-4 has moved to the second stripe of the replacement disk (stripe k-2). In this case, the process calculates new parity by reading stripes 1-2, 2-2, and k-2, and then writes new parity to the parity storage device. The process does this operation in every stripes that the parity reconstruction bit 404' is set.

Thus according to the present invention an apparatus, method and computer program, particularly, for example, a method and apparatus for placing objects on a storage device of a RAID storage system and reconstructing data of objects in a storage device of a RAID storage system are provided. Therefore, by use of the present invention, a RAID storage system can be implemented that takes into consideration the functionalities necessary to implement OSD technology in a RAID architecture, wherein the efficient placement and reconstruction of data of objects is possible.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A storage system for storing data as objects comprising:
a plurality of storage devices; and
a disk controller for controlling said storage devices,
wherein each of said objects includes attribute which defines attributes of the object and data,
wherein said storage devices are configured to implement a Redundant Array of Inexpensive Disks (RAID) architecture,
wherein each of said storage devices is formatted to include a plurality of stripes each having a predetermined length and at least one logical unit (LU) is formed by all or a portion of one or a plurality of said storage devices,
wherein each object is stored on said LU such that an attribute of the object is stored in the head of a stripe and data of the object is stored just after the attribute,
wherein when another object is to be stored, an attribute of the another object is stored at a head of the next stripe and data of the another object is stored just after the attribute in the next stripe, said stripe which includes attribute and data or data is referred to as a data stripe,
wherein according to the RAID architecture being implemented, parity data is calculated based on certain ones of the data stripes, said parity data is stored in a stripe of a storage device and such stripe is referred as a parity stripe, and
wherein the RAID architecture being implemented is defined according to a RAID configuration table which includes a plurality of entries each including a port identifier ID, a logical unit number (LUN), a storage device (disk) ID, a RAID level, and a stripe size, thereby defining for each combination of port ID and LUN, a logical storage device which is formed by all or a portion of one or a plurality of said storage devices and a RAID level and stripe size to be used on said logical storage device.

2. A storage system for storing data as objects comprising:
a plurality of storage devices; and
a disk controller for controlling said storage devices,
wherein each of said objects includes attribute which defines attributes of the object and data,
wherein said storage devices are configured to implement a Redundant Array of Inexpensive Disks (RAID) architecture,
wherein each of said storage devices is formatted to include a plurality of stripes each having a predetermined length and at least one logical unit (LU) is formed by all or a portion of one or a plurality of said storage devices,
wherein each object is stored on said LU such that an attribute of the object is stored in the head of a stripe and data of the object is stored just after the attribute,
wherein when another object is to be stored, an attribute of the another object is stored at a head of the next stripe and data of the another object is stored just after the attribute in the next stripe, said stripe which includes attribute and data or data is referred to as a data stripe, wherein according to the RAID architecture being implemented, parity data is calculated based on certain ones of the data stripes, said parity data is stored in a stripe of a storage device and such stripe is referred as a parity stripe, wherein a logical-physical (LP) mapping table is used by said storage system to manage relations between objects and stripes, wherein said LP mapping table is used to search for a location of an object when said storage system receives an I/O command, and wherein said LP mapping table includes a plurality of entries each having a port identifier (ID) which identifies a particular port through which a logical storage device can be accessed, a logical unit number (LUN) which identifies a particular logical unit (LU) where an object is stored, a partition ID which identifies a partition on a storage device which forms the LU within which the object is stored, an object ID which identifies the object, and disk location information which identifies in which stripe the object, specified by the partition ID and object ID, is stored.

3. A storage system for storing data as objects comprising:
a plurality of storage devices; and
a disk controller for controlling said storage devices,
wherein each of said objects includes attribute which defines attributes of the object and data,
wherein said storage devices are configured to implement a Redundant Array of Inexpensive Disks (RAID) architecture,
wherein each of said storage devices is formatted to include a plurality of stripes each having a predetermined length and at least one logical unit (LU) is formed by all or a portion of one or a plurality of said storage devices,
wherein each object is stored on said LU such that an attribute of the object is stored in the head of a stripe and data of the object is stored just after the attribute,
wherein when another object is to be stored, an attribute of the another object is stored at a head of the next stripe and data of the another object is stored just after the attribute in the next stripe, said stripe which includes attribute and data or data is referred to as a data stripe,
wherein according to the RAID architecture being implemented, parity data is calculated based on certain ones of the data stripes, said parity data is stored in a stripe of a storage device and such stripe is referred as a parity stripe,
wherein a physical-logical (PL) mapping table is used by said storage system to manage relations between disk blocks of each of said storage systems and objects,
wherein said PL mapping table is used to search which disk block contains a particular object, and
wherein said PL mapping table includes a plurality of entries each having a stripe identifier (ID) which identifies a particular stripe which contains a particular object, a port ID which identifies a particular port through which a logical storage device can be accessed, a logical unit number (LUN) which identifies a particular logical unit (LU) where the object is stored, a partition ID which identifies a partition on a storage device which forms the LU within which the object is stored, and an object ID which identifies the object.

4. A storage system for storing data as objects comprising:
a plurality of storage devices; and
a disk controller for controlling said storage devices,
wherein each of said objects includes attribute which defines attributes of the object and data,
wherein said storage devices are configured to implement a Redundant Array of Inexpensive Disks (RAID) architecture,
wherein each of said storage devices is formatted to include a plurality of stripes each having a predetermined length and at least one logical unit (LU) is formed by all or a portion of one or a plurality of said storage devices,
wherein each object is stored on said LU such that an attribute of the object is stored in the head of a stripe and data of the object is stored just after the attribute,
wherein when another object is to be stored, an attribute of the another object is stored at a head of the next stripe and data of the another object is stored just after the attribute in the next stripe, said stripe which includes attribute and data or data is referred to as a data stripe,
wherein according to the RAID architecture being implemented, parity data is calculated based on certain ones of the data stripes, said parity data is stored in a stripe of a storage device and such stripe is referred as a parity stripe,
wherein when one of said storage devices fails, a data reconstruction process is implemented such that data recovery is performed on each data stripe where an object or a part of said object is stored,
wherein when a storage device fails, said storage system creates for said storage device a list of stripes included in said storage device within which objects are stored, and
wherein said list is a disk reconstruction bitmap which includes a plurality of entries each including a stripe identifier (ID) which identifies a particular stripe, recovery information which indicates whether the identified stripe is to be recovered, and done information which indicates whether the data reconstruction of the identified stripe has been completed.

5. A storage system for storing data as objects comprising:
a plurality of storage devices; and
a disk controller for controlling said storage devices,
wherein each of said objects includes attribute which defines attributes of the object and data,
wherein said storage devices are configured to implement a Redundant Array of Inexpensive Disks (RAID) architecture,
wherein each of said storage devices is formatted to include a plurality of stripes each having a predetermined length and at least one logical unit (LU) is formed by all or a portion of one or a plurality of said storage devices,
wherein each object is stored on said LU such that an attribute of the object is stored in the head of a stripe and data of the object is stored just after the attribute,
wherein when another object is to be stored, an attribute of the another object is stored at a head of the next stripe and data of the another object is stored just after the attribute in the next stripe, said stripe which includes attribute and data or data is referred to as a data stripe,
wherein according to the RAID architecture being implemented, parity data is calculated based on certain ones of the data stripes, said parity data is stored in a stripe of a storage device and such stripe is referred as a parity stripe, wherein when a storage device fails, a data reconstruction process is implemented such that data recovery is performed on each data stripe where an object or a part of said object is stored, and wherein during said data reconstruction process isolated stripes each being stored at locations on a storage device separated from other stripes are relocated to be adjacent to the other stripes.

6. The storage system according to claim 5, wherein when a storage device fails, said storage system creates for said storage device a list of stripes including only those stripes within which an object or a part of said object is stored and which are to be reconstructed.

7. The storage system according to claim 6, wherein said list is a disk reconstruction bitmap which includes a plurality of entries each including a stripe identifier (ID) which identifies a particular stripe, new location information which indicates a new location for the reconstructed data of the identified stripe, done information which indicates whether the data reconstruction of the identified stripe has been completed, and parity reconstruction information which indicates when whether a parity stripe corresponding to the identified stripe has been reconstructed.

8. A storage system for storing data as objects comprising:
a plurality of storage devices; and
a disk controller for controlling said storage devices,
wherein each of said objects includes an attribute which defines attributes of the object and data,
wherein said storage devices are configured to implement a Redundant Arrays of Inexpensive Disks (RAID) architecture,
wherein each of said storage devices is formatted to include a plurality of stripes each having a predetermined length and at least one logical unit (LU) is formed by all or a portion of one or a plurality of said storage devices,
wherein when one of said storage devices fails, a data reconstruction process is implemented such that data recovery is performed on each data stripe where an object or a part of said object is stored and each parity stripe where parity data is stored, and
wherein the RAID architecture being implemented is defined according to a RAID configuration table which includes a plurality of entries each including a port identifier (ID), a logical unit number (LUN), a storage device (disk) ID, a RAID level, and a stripe size, thereby defining for each combination of port ID and LUN, a logical storage device which is formed by all or a portion of one or a plurality of said storage devices and a RAID level and stripe size to be used on said logical storage device.

9. A storage system for storing data as objects comprising:
a plurality of storage devices; and
a disk controller for controlling said storage devices,
wherein each of said objects includes an attribute which defines attributes of the object and data,
wherein said storage devices are configured to implement a Redundant Arrays of Inexpensive Disks (RAID) architecture,
wherein each of said storage devices is formatted to include a plurality of stripes each having a predetermined length and at least one logical unit (LU) is formed by all or a portion of one or a plurality of said storage devices, wherein when one of said storage devices fails, a data reconstruction process is implemented such that data recovery is performed on each data stripe where an object or a part of said object is stored and each parity stripe where parity data is stored, wherein a logical-physical (LP) mapping table is used by said storage system to manage relations between objects and stripes, wherein said LP mapping table is used to search for a location of an object when said storage system receives an I/O command, and wherein said LP mapping table includes a plurality of entries each having a port identifier (ID) which identifies a particular port through which a logical storage device can be accessed, a logical unit number (LUN) which identifies a particular logical unit (LU) where an object is stored, a partition ID which identifies a partition on a storage device which forms the LU within which the object is stored, an object ID which identifies the object, and disk location information which identifies in which stripe the object, specified by the partition ID and object ID, is stored.

10. A storage system for storing data as objects comprising:
a plurality of storage devices; and
a disk controller for controlling said storage devices,
wherein each of said objects includes an attribute which defines attributes of the object and data,
wherein said storage devices are configured to implement a Redundant Arrays of Inexpensive Disks (RAID) architecture,
wherein each of said storage devices is formatted to include a plurality of stripes each having a predetermined length and at least one logical unit (LU) is formed by all or a portion of one or a plurality of said storage devices,
wherein when one of said storage devices fails, a data reconstruction process is implemented such that data recovery is performed on each data stripe where an object or a part of said object is stored and each parity stripe where parity data is stored,
wherein a physical-logical (PL) mapping table is used by said storage system to manage relations between disk blocks of each of said storage systems and objects,
wherein said PL mapping table is used to search which disk block contains a particular object, and
wherein said PL mapping table includes a plurality of entries each having a stripe identifier (ID) which identifies a particular stripe which contains a particular object, a port ID which identifies a particular port through which a logical storage device can be accessed, a logical unit number (LUN) which identifies a particular logical unit (LU) where the object is stored, a partition ID which identifies a partition on a storage device which forms the LU within which the object is stored, and an object ID which identifies the object.

11. A storage system for storing data as objects comprising:
a plurality of storage devices; and
a disk controller for controlling said storage devices,
wherein each of said objects includes an attribute which defines attributes of the object and data,
wherein said storage devices are configured to implement a Redundant Arrays of Inexpensive Disks (RAID) architecture,
wherein each of said storage devices is formatted to include a plurality of stripes each having a predetermined length and at least one logical unit (LU) is formed by all or a portion of one or a plurality of said storage devices, wherein when one of said storage devices fails, a data reconstruction process is implemented such that data recovery is performed on each data stripe where an object or a part of said object is stored and each parity stripe where parity data is stored, wherein when a storage device fails, said storage system creates for said storage device a list of stripes included in said storage device within which objects are stored, and wherein said list is a disk reconstruction bitmap which includes a plurality of entries each including a stripe identifier (ID) which identifies a particular stripe, recovery information which indicates whether the identified stripe is to be recovered, and done information which indicates whether the data reconstruction of the identified stripe has been completed.

12. A storage system for storing data as objects comprising:

a plurality of storage devices; and a disk controller for controlling said storage devices, wherein each of said objects includes an attribute which defines attributes of the object and data, wherein said storage devices are configured to implement a Redundant Arrays of Inexpensive Disks (RAID) architecture, wherein each of said storage devices is formatted to include a plurality of stripes each having a predetermined length and at least one logical unit (LU) is formed by all or a portion of one or a plurality of said storage devices, wherein when one of said storage devices fails, a data reconstruction process is implemented such that data recovery is performed on each data stripe where an object or a part of said object is stored and each parity stripe where parity data is stored, and wherein during said data reconstruction process isolated stripes each being stored at locations on a storage device separated from other stripes are relocated to be adjacent to the other stripes.

13. The storage system according to claim 12, wherein when a storage device fails, said storage system creates for said storage device a list of stripes including only those stripes within which an object is stored and which are to be reconstructed.

14. The storage system according to claim 13, wherein said list is a disk reconstruction bitmap which includes a plurality of entries each including a stripe identifier (ID) which identifies a particular stripe, new location information which indicates a new location for the reconstructed data of the identified stripe, done information which indicates whether the data reconstruction of the identified stripe has been completed, and parity reconstruction information which indicates when whether a parity stripe corresponding to the identified stripe has been reconstructed.

* * * * *